United States Patent
Stevens

(10) Patent No.: US 7,936,917 B2
(45) Date of Patent: May 3, 2011

(54) SYSTEMS AND METHODS FOR IMAGE DATA ENCODING AND DECODING

(75) Inventor: Michael T. Stevens, Aloha, OR (US)

(73) Assignee: Xerox Corporation, Norwalk, CT (US)

( * ) Notice: Subject to any disclaimer, the term of this patent is extended or adjusted under 35 U.S.C. 154(b) by 820 days.

(21) Appl. No.: 11/947,938

(22) Filed: Nov. 30, 2007

(65) Prior Publication Data

US 2009/0141994 A1 Jun. 4, 2009

(51) Int. Cl.
*G06K 9/00* (2006.01)

(52) U.S. Cl. ........ 382/162; 382/237; 382/232; 382/233; 382/274

(58) Field of Classification Search .......... 382/232, 382/233, 245, 246, 250, 251, 237, 162, 274; 358/1.13, 1.15, 3.06, 3.2; 345/596, 690, 697, 503, 619

See application file for complete search history.

(56) References Cited

U.S. PATENT DOCUMENTS

| 2001/0021971 A1* | 9/2001 | Gibson et al. ............... 712/215 |
| 2002/0057446 A1* | 5/2002 | Long et al. ............... 358/1.13 |
| 2005/0276501 A1* | 12/2005 | Nakayama et al. ........... 382/251 |

* cited by examiner

*Primary Examiner* — Samir A Ahmed
*Assistant Examiner* — Ali Bayat
(74) *Attorney, Agent, or Firm* — Fay Sharpe LLP

(57) ABSTRACT

Image processing systems and methods are presented for encoding 8-bit color image data to 4-bit data using an encoding table by assigning a pixel type value to each 8-bit pixel according to a 9×3 tiling pattern with 9 unique pixel type values in each 3×3 window of the 9×3 tiling pattern, and for decoding the 4-bit image data based on the pixel type value and the encoded data values for neighboring pixels.

20 Claims, 26 Drawing Sheets

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 0 | 0 | 0 | 0 | 0 | 0 | 0 | 0 | 0 | 0 |
| 1 | 1 | 0 | 0 | 0 | 0 | 0 | 0 | 0 | 0 |
| 2 | 0 | 0 | 0 | 0 | 0 | 0 | 1 | 0 | 0 |
| 3 | 1 | 0 | 0 | 0 | 0 | 0 | 1 | 0 | 0 |
| 4 | 0 | 0 | 0 | 0 | 0 | 1 | 1 | 0 | 0 |
| 5 | 1 | 0 | 0 | 0 | 0 | 1 | 1 | 0 | 0 |
| 6 | 0 | 1 | 0 | 0 | 0 | 1 | 1 | 0 | 0 |
| 7 | 1 | 1 | 0 | 0 | 0 | 1 | 1 | 0 | 0 |
| 8 | 0 | 1 | 0 | 0 | 0 | 1 | 1 | 0 | 1 |
| 9 | 1 | 1 | 0 | 0 | 0 | 1 | 1 | 0 | 1 |
| 10 | 0 | 1 | 0 | 1 | 0 | 1 | 1 | 0 | 1 |
| 11 | 1 | 1 | 0 | 1 | 0 | 1 | 1 | 0 | 1 |
| 12 | 0 | 1 | 0 | 1 | 1 | 1 | 1 | 0 | 1 |
| 13 | 1 | 1 | 0 | 1 | 1 | 1 | 1 | 0 | 1 |
| 14 | 0 | 1 | 1 | 1 | 1 | 1 | 1 | 0 | 1 |
| 15 | 1 | 1 | 1 | 1 | 1 | 1 | 1 | 0 | 1 |
| 16 | 0 | 1 | 1 | 1 | 1 | 1 | 1 | 1 | 1 |
| 17 | 1 | 1 | 1 | 1 | 1 | 1 | 1 | 1 | 1 |
| 18 | 0 | 1 | 1 | 1 | 1 | 1 | 2 | 1 | 1 |
| 19 | 1 | 1 | 1 | 1 | 1 | 1 | 2 | 1 | 1 |
| 20 | 0 | 1 | 1 | 1 | 1 | 2 | 2 | 1 | 1 |
| 21 | 1 | 1 | 1 | 1 | 1 | 2 | 2 | 1 | 1 |
| 22 | 0 | 2 | 1 | 1 | 1 | 2 | 2 | 1 | 1 |
| 23 | 1 | 2 | 1 | 1 | 1 | 2 | 2 | 1 | 1 |
| 24 | 0 | 2 | 1 | 1 | 1 | 2 | 2 | 1 | 2 |
| 25 | 1 | 2 | 1 | 1 | 1 | 2 | 2 | 1 | 2 |
| 26 | 0 | 2 | 1 | 2 | 1 | 2 | 2 | 1 | 2 |
| 27 | 1 | 2 | 1 | 2 | 1 | 2 | 2 | 1 | 2 |
| 28 | 0 | 2 | 1 | 2 | 2 | 2 | 2 | 1 | 2 |
| 29 | 1 | 2 | 1 | 2 | 2 | 2 | 2 | 1 | 2 |
| 30 | 0 | 2 | 2 | 2 | 2 | 2 | 2 | 1 | 2 |
| 31 | 1 | 2 | 2 | 2 | 2 | 2 | 2 | 1 | 2 |
| 32 | 0 | 2 | 2 | 2 | 2 | 2 | 2 | 2 | 2 |
| 33 | 1 | 2 | 2 | 2 | 2 | 2 | 2 | 2 | 2 |
| 34 | 2 | 2 | 2 | 2 | 2 | 2 | 2 | 2 | 2 |

*FIG. 6A*

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 35 | 3 | 2 | 2 | 2 | 2 | 2 | 2 | 2 | 2 |
| 36 | 2 | 2 | 2 | 2 | 2 | 2 | 3 | 2 | 2 |
| 37 | 3 | 2 | 2 | 2 | 2 | 2 | 3 | 2 | 2 |
| 38 | 2 | 2 | 2 | 2 | 2 | 3 | 3 | 2 | 2 |
| 39 | 3 | 2 | 2 | 2 | 2 | 3 | 3 | 2 | 2 |
| 40 | 2 | 3 | 2 | 2 | 2 | 3 | 3 | 2 | 2 |
| 41 | 3 | 3 | 2 | 2 | 2 | 3 | 3 | 2 | 2 |
| 42 | 2 | 3 | 2 | 2 | 2 | 3 | 3 | 2 | 3 |
| 43 | 3 | 3 | 2 | 2 | 2 | 3 | 3 | 2 | 3 |
| 44 | 2 | 3 | 2 | 3 | 2 | 3 | 3 | 2 | 3 |
| 45 | 3 | 3 | 2 | 3 | 2 | 3 | 3 | 2 | 3 |
| 46 | 2 | 3 | 2 | 3 | 3 | 3 | 3 | 2 | 3 |
| 47 | 3 | 3 | 2 | 3 | 3 | 3 | 3 | 2 | 3 |
| 48 | 2 | 3 | 3 | 3 | 3 | 3 | 3 | 2 | 3 |
| 49 | 3 | 3 | 3 | 3 | 3 | 3 | 3 | 2 | 3 |
| 50 | 2 | 3 | 3 | 3 | 3 | 3 | 3 | 3 | 3 |
| 51 | 3 | 3 | 3 | 3 | 3 | 3 | 3 | 3 | 3 |
| 52 | 2 | 3 | 3 | 3 | 3 | 3 | 4 | 3 | 3 |
| 53 | 3 | 3 | 3 | 3 | 3 | 3 | 4 | 3 | 3 |
| 54 | 2 | 3 | 3 | 3 | 3 | 4 | 4 | 3 | 3 |
| 55 | 3 | 3 | 3 | 3 | 3 | 4 | 4 | 3 | 3 |
| 56 | 2 | 4 | 3 | 3 | 3 | 4 | 4 | 3 | 3 |
| 57 | 3 | 4 | 3 | 3 | 3 | 4 | 4 | 3 | 3 |
| 58 | 2 | 4 | 3 | 3 | 3 | 4 | 4 | 3 | 4 |
| 59 | 3 | 4 | 3 | 3 | 3 | 4 | 4 | 3 | 4 |
| 60 | 2 | 4 | 3 | 4 | 3 | 4 | 4 | 3 | 4 |
| 61 | 3 | 4 | 3 | 4 | 3 | 4 | 4 | 3 | 4 |
| 62 | 2 | 4 | 3 | 4 | 4 | 4 | 4 | 3 | 4 |
| 63 | 3 | 4 | 3 | 4 | 4 | 4 | 4 | 3 | 4 |
| 64 | 2 | 4 | 4 | 4 | 4 | 4 | 4 | 3 | 4 |
| 65 | 3 | 4 | 4 | 4 | 4 | 4 | 4 | 3 | 4 |
| 66 | 2 | 4 | 4 | 4 | 4 | 4 | 4 | 4 | 4 |
| 67 | 3 | 4 | 4 | 4 | 4 | 4 | 4 | 4 | 4 |
| 68 | 4 | 4 | 4 | 4 | 4 | 4 | 4 | 4 | 4 |
| 69 | 5 | 4 | 4 | 4 | 4 | 4 | 4 | 4 | 4 |

FIG. 6B

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 70 | 4 | 4 | 4 | 4 | 4 | 4 | 5 | 4 | 4 |
| 71 | 5 | 4 | 4 | 4 | 4 | 4 | 5 | 4 | 4 |
| 72 | 4 | 4 | 4 | 4 | 4 | 5 | 5 | 4 | 4 |
| 73 | 5 | 4 | 4 | 4 | 4 | 5 | 5 | 4 | 4 |
| 74 | 4 | 5 | 4 | 4 | 4 | 5 | 5 | 4 | 4 |
| 75 | 5 | 5 | 4 | 4 | 4 | 5 | 5 | 4 | 4 |
| 76 | 4 | 5 | 4 | 4 | 4 | 5 | 5 | 4 | 5 |
| 77 | 5 | 5 | 4 | 4 | 4 | 5 | 5 | 4 | 5 |
| 78 | 4 | 5 | 4 | 5 | 4 | 5 | 5 | 4 | 5 |
| 79 | 5 | 5 | 4 | 5 | 4 | 5 | 5 | 4 | 5 |
| 80 | 4 | 5 | 4 | 5 | 5 | 5 | 5 | 4 | 5 |
| 81 | 5 | 5 | 4 | 5 | 5 | 5 | 5 | 4 | 5 |
| 82 | 4 | 5 | 5 | 5 | 5 | 5 | 5 | 4 | 5 |
| 83 | 5 | 5 | 5 | 5 | 5 | 5 | 5 | 4 | 5 |
| 84 | 4 | 5 | 5 | 5 | 5 | 5 | 5 | 5 | 5 |
| 85 | 5 | 5 | 5 | 5 | 5 | 5 | 5 | 5 | 5 |
| 86 | 4 | 5 | 5 | 5 | 5 | 5 | 6 | 5 | 5 |
| 87 | 5 | 5 | 5 | 5 | 5 | 5 | 6 | 5 | 5 |
| 88 | 4 | 5 | 5 | 5 | 5 | 6 | 6 | 5 | 5 |
| 89 | 5 | 5 | 5 | 5 | 5 | 6 | 6 | 5 | 5 |
| 90 | 4 | 6 | 5 | 5 | 5 | 6 | 6 | 5 | 5 |
| 91 | 5 | 6 | 5 | 5 | 5 | 6 | 6 | 5 | 5 |
| 92 | 4 | 6 | 5 | 5 | 5 | 6 | 6 | 5 | 6 |
| 93 | 5 | 6 | 5 | 5 | 5 | 6 | 6 | 5 | 6 |
| 94 | 4 | 6 | 5 | 6 | 5 | 6 | 6 | 5 | 6 |
| 95 | 5 | 6 | 5 | 6 | 5 | 6 | 6 | 5 | 6 |
| 96 | 4 | 6 | 5 | 6 | 6 | 6 | 6 | 5 | 6 |
| 97 | 5 | 6 | 5 | 6 | 6 | 6 | 6 | 5 | 6 |
| 98 | 4 | 6 | 6 | 6 | 6 | 6 | 6 | 5 | 6 |
| 99 | 5 | 6 | 6 | 6 | 6 | 6 | 6 | 5 | 6 |
| 100 | 4 | 6 | 6 | 6 | 6 | 6 | 6 | 6 | 6 |
| 101 | 5 | 6 | 6 | 6 | 6 | 6 | 6 | 6 | 6 |
| 102 | 6 | 6 | 6 | 6 | 6 | 6 | 6 | 6 | 6 |
| 103 | 7 | 6 | 6 | 6 | 6 | 6 | 6 | 6 | 6 |
| 104 | 6 | 6 | 6 | 6 | 6 | 6 | 7 | 6 | 6 |

*FIG. 6C*

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 105 | 7 | 6 | 6 | 6 | 6 | 6 | 7 | 6 | 6 |
| 106 | 6 | 6 | 6 | 6 | 6 | 7 | 7 | 6 | 6 |
| 107 | 7 | 6 | 6 | 6 | 6 | 7 | 7 | 6 | 6 |
| 108 | 6 | 7 | 6 | 6 | 6 | 7 | 7 | 6 | 6 |
| 109 | 7 | 7 | 6 | 6 | 6 | 7 | 7 | 6 | 6 |
| 110 | 6 | 7 | 6 | 6 | 6 | 7 | 7 | 6 | 7 |
| 111 | 7 | 7 | 6 | 6 | 6 | 7 | 7 | 6 | 7 |
| 112 | 6 | 7 | 6 | 7 | 6 | 7 | 7 | 6 | 7 |
| 113 | 7 | 7 | 6 | 7 | 6 | 7 | 7 | 6 | 7 |
| 114 | 6 | 7 | 6 | 7 | 7 | 7 | 7 | 6 | 7 |
| 115 | 7 | 7 | 6 | 7 | 7 | 7 | 7 | 6 | 7 |
| 116 | 6 | 7 | 7 | 7 | 7 | 7 | 7 | 6 | 7 |
| 117 | 7 | 7 | 7 | 7 | 7 | 7 | 7 | 6 | 7 |
| 118 | 6 | 7 | 7 | 7 | 7 | 7 | 7 | 7 | 7 |
| 119 | 7 | 7 | 7 | 7 | 7 | 7 | 7 | 7 | 7 |
| 120 | 6 | 7 | 7 | 7 | 7 | 7 | 8 | 7 | 7 |
| 121 | 7 | 7 | 7 | 7 | 7 | 7 | 8 | 7 | 7 |
| 122 | 6 | 7 | 7 | 7 | 7 | 8 | 8 | 7 | 7 |
| 123 | 7 | 7 | 7 | 7 | 7 | 8 | 8 | 7 | 7 |
| 124 | 6 | 8 | 7 | 7 | 7 | 8 | 8 | 7 | 7 |
| 125 | 7 | 8 | 7 | 7 | 7 | 8 | 8 | 7 | 7 |
| 126 | 6 | 8 | 7 | 7 | 7 | 8 | 8 | 7 | 8 |
| 127 | 7 | 8 | 7 | 7 | 7 | 8 | 8 | 7 | 8 |
| 128 | 7 | 8 | 7 | 8 | 7 | 8 | 8 | 7 | 8 |
| 129 | 6 | 8 | 7 | 8 | 7 | 8 | 8 | 7 | 8 |
| 130 | 7 | 8 | 7 | 8 | 8 | 8 | 8 | 7 | 8 |
| 131 | 6 | 8 | 7 | 8 | 8 | 8 | 8 | 7 | 8 |
| 132 | 7 | 8 | 8 | 8 | 8 | 8 | 8 | 7 | 8 |
| 133 | 6 | 8 | 8 | 8 | 8 | 8 | 8 | 7 | 8 |
| 134 | 7 | 8 | 8 | 8 | 8 | 8 | 8 | 8 | 8 |
| 135 | 6 | 8 | 8 | 8 | 8 | 8 | 8 | 8 | 8 |
| 136 | 9 | 8 | 8 | 8 | 8 | 8 | 8 | 8 | 8 |
| 137 | 8 | 8 | 8 | 8 | 8 | 8 | 8 | 8 | 8 |
| 138 | 9 | 8 | 8 | 8 | 8 | 8 | 9 | 8 | 8 |
| 139 | 8 | 8 | 8 | 8 | 8 | 8 | 9 | 8 | 8 |

*FIG. 6D*

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 140 | 9 | 8 | 8 | 8 | 8 | 9 | 9 | 8 | 8 |
| 141 | 8 | 8 | 8 | 8 | 8 | 9 | 9 | 8 | 8 |
| 142 | 9 | 9 | 8 | 8 | 8 | 9 | 9 | 8 | 8 |
| 143 | 8 | 9 | 8 | 8 | 8 | 9 | 9 | 8 | 8 |
| 144 | 9 | 9 | 8 | 8 | 8 | 9 | 9 | 8 | 9 |
| 145 | 8 | 9 | 8 | 8 | 8 | 9 | 9 | 8 | 9 |
| 146 | 9 | 9 | 8 | 9 | 8 | 9 | 9 | 8 | 9 |
| 147 | 8 | 9 | 8 | 9 | 8 | 9 | 9 | 8 | 9 |
| 148 | 9 | 9 | 8 | 9 | 9 | 9 | 9 | 8 | 9 |
| 149 | 8 | 9 | 8 | 9 | 9 | 9 | 9 | 8 | 9 |
| 150 | 9 | 9 | 9 | 9 | 9 | 9 | 9 | 8 | 9 |
| 151 | 8 | 9 | 9 | 9 | 9 | 9 | 9 | 8 | 9 |
| 152 | 9 | 9 | 9 | 9 | 9 | 9 | 9 | 9 | 9 |
| 153 | 8 | 9 | 9 | 9 | 9 | 9 | 9 | 9 | 9 |
| 154 | 9 | 9 | 9 | 9 | 9 | 9 | 10 | 9 | 9 |
| 155 | 8 | 9 | 9 | 9 | 9 | 9 | 10 | 9 | 9 |
| 156 | 9 | 9 | 9 | 9 | 9 | 10 | 10 | 9 | 9 |
| 157 | 8 | 9 | 9 | 9 | 9 | 10 | 10 | 9 | 9 |
| 158 | 9 | 10 | 9 | 9 | 9 | 10 | 10 | 9 | 9 |
| 159 | 8 | 10 | 9 | 9 | 9 | 10 | 10 | 9 | 9 |
| 160 | 9 | 10 | 9 | 9 | 9 | 10 | 10 | 9 | 10 |
| 161 | 8 | 10 | 9 | 9 | 9 | 10 | 10 | 9 | 10 |
| 162 | 9 | 10 | 9 | 10 | 9 | 10 | 10 | 9 | 10 |
| 163 | 8 | 10 | 9 | 10 | 9 | 10 | 10 | 9 | 10 |
| 164 | 9 | 10 | 9 | 10 | 10 | 10 | 10 | 9 | 10 |
| 165 | 8 | 10 | 9 | 10 | 10 | 10 | 10 | 9 | 10 |
| 166 | 9 | 10 | 10 | 10 | 10 | 10 | 10 | 9 | 10 |
| 167 | 8 | 10 | 10 | 10 | 10 | 10 | 10 | 9 | 10 |
| 168 | 9 | 10 | 10 | 10 | 10 | 10 | 10 | 10 | 10 |
| 169 | 8 | 10 | 10 | 10 | 10 | 10 | 10 | 10 | 10 |
| 170 | 11 | 10 | 10 | 10 | 10 | 10 | 10 | 10 | 10 |
| 171 | 10 | 10 | 10 | 10 | 10 | 10 | 10 | 10 | 10 |
| 172 | 11 | 10 | 10 | 10 | 10 | 10 | 11 | 10 | 10 |
| 173 | 10 | 10 | 10 | 10 | 10 | 10 | 11 | 10 | 10 |
| 174 | 11 | 10 | 10 | 10 | 10 | 11 | 11 | 10 | 10 |

FIG. 6E

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 175 | 10 | 10 | 10 | 10 | 10 | 11 | 11 | 10 | 10 |
| 176 | 11 | 11 | 10 | 10 | 10 | 11 | 11 | 10 | 10 |
| 177 | 10 | 11 | 10 | 10 | 10 | 11 | 11 | 10 | 10 |
| 178 | 11 | 11 | 10 | 10 | 10 | 11 | 11 | 10 | 11 |
| 179 | 10 | 11 | 10 | 10 | 10 | 11 | 11 | 10 | 11 |
| 180 | 11 | 11 | 10 | 11 | 10 | 11 | 11 | 10 | 11 |
| 181 | 10 | 11 | 10 | 11 | 10 | 11 | 11 | 10 | 11 |
| 182 | 11 | 11 | 10 | 11 | 11 | 11 | 11 | 10 | 11 |
| 183 | 10 | 11 | 10 | 11 | 11 | 11 | 11 | 10 | 11 |
| 184 | 11 | 11 | 11 | 11 | 11 | 11 | 11 | 10 | 11 |
| 185 | 10 | 11 | 11 | 11 | 11 | 11 | 11 | 10 | 11 |
| 186 | 11 | 11 | 11 | 11 | 11 | 11 | 11 | 11 | 11 |
| 187 | 10 | 11 | 11 | 11 | 11 | 11 | 11 | 11 | 11 |
| 188 | 11 | 11 | 11 | 11 | 11 | 11 | 12 | 11 | 11 |
| 189 | 10 | 11 | 11 | 11 | 11 | 11 | 12 | 11 | 11 |
| 190 | 11 | 11 | 11 | 11 | 11 | 12 | 12 | 11 | 11 |
| 191 | 10 | 11 | 11 | 11 | 11 | 12 | 12 | 11 | 11 |
| 192 | 11 | 12 | 11 | 11 | 11 | 12 | 12 | 11 | 11 |
| 193 | 10 | 12 | 11 | 11 | 11 | 12 | 12 | 11 | 11 |
| 194 | 11 | 12 | 11 | 11 | 11 | 12 | 12 | 11 | 12 |
| 195 | 10 | 12 | 11 | 11 | 11 | 12 | 12 | 11 | 12 |
| 196 | 11 | 12 | 11 | 12 | 11 | 12 | 12 | 11 | 12 |
| 197 | 10 | 12 | 11 | 12 | 11 | 12 | 12 | 11 | 12 |
| 198 | 11 | 12 | 11 | 12 | 12 | 12 | 12 | 11 | 12 |
| 199 | 10 | 12 | 11 | 12 | 12 | 12 | 12 | 11 | 12 |
| 200 | 11 | 12 | 12 | 12 | 12 | 12 | 12 | 11 | 12 |
| 201 | 10 | 12 | 12 | 12 | 12 | 12 | 12 | 11 | 12 |
| 202 | 11 | 12 | 12 | 12 | 12 | 12 | 12 | 12 | 12 |
| 203 | 10 | 12 | 12 | 12 | 12 | 12 | 12 | 12 | 12 |
| 204 | 13 | 12 | 12 | 12 | 12 | 12 | 12 | 12 | 12 |
| 205 | 12 | 12 | 12 | 12 | 12 | 12 | 12 | 12 | 12 |
| 206 | 13 | 12 | 12 | 12 | 12 | 12 | 13 | 12 | 12 |
| 207 | 12 | 12 | 12 | 12 | 12 | 12 | 13 | 12 | 12 |
| 208 | 13 | 12 | 12 | 12 | 12 | 13 | 13 | 12 | 12 |
| 209 | 12 | 12 | 12 | 12 | 12 | 13 | 13 | 12 | 12 |

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 210 | 13 | 13 | 12 | 12 | 12 | 13 | 13 | 12 | 12 |
| 211 | 12 | 13 | 12 | 12 | 12 | 13 | 13 | 12 | 12 |
| 212 | 13 | 13 | 12 | 12 | 12 | 13 | 13 | 12 | 13 |
| 213 | 12 | 13 | 12 | 12 | 12 | 13 | 13 | 12 | 13 |
| 214 | 13 | 13 | 12 | 13 | 12 | 13 | 13 | 12 | 13 |
| 215 | 12 | 13 | 12 | 13 | 12 | 13 | 13 | 12 | 13 |
| 216 | 13 | 13 | 12 | 13 | 13 | 13 | 13 | 12 | 13 |
| 217 | 12 | 13 | 12 | 13 | 13 | 13 | 13 | 12 | 13 |
| 218 | 13 | 13 | 13 | 13 | 13 | 13 | 13 | 12 | 13 |
| 219 | 12 | 13 | 13 | 13 | 13 | 13 | 13 | 12 | 13 |
| 220 | 13 | 13 | 13 | 13 | 13 | 13 | 13 | 13 | 13 |
| 221 | 12 | 13 | 13 | 13 | 13 | 13 | 13 | 13 | 13 |
| 222 | 13 | 13 | 13 | 13 | 13 | 13 | 14 | 13 | 13 |
| 223 | 12 | 13 | 13 | 13 | 13 | 13 | 14 | 13 | 13 |
| 224 | 13 | 13 | 13 | 13 | 13 | 14 | 14 | 13 | 13 |
| 225 | 12 | 13 | 13 | 13 | 13 | 14 | 14 | 13 | 13 |
| 226 | 13 | 14 | 13 | 13 | 13 | 14 | 14 | 13 | 13 |
| 227 | 12 | 14 | 13 | 13 | 13 | 14 | 14 | 13 | 13 |
| 228 | 13 | 14 | 13 | 13 | 13 | 14 | 14 | 13 | 14 |
| 229 | 12 | 14 | 13 | 13 | 13 | 14 | 14 | 13 | 14 |
| 230 | 13 | 14 | 13 | 14 | 13 | 14 | 14 | 13 | 14 |
| 231 | 12 | 14 | 13 | 14 | 13 | 14 | 14 | 13 | 14 |
| 232 | 13 | 14 | 13 | 14 | 14 | 14 | 14 | 13 | 14 |
| 233 | 12 | 14 | 13 | 14 | 14 | 14 | 14 | 13 | 14 |
| 234 | 13 | 14 | 14 | 14 | 14 | 14 | 14 | 13 | 14 |
| 235 | 12 | 14 | 14 | 14 | 14 | 14 | 14 | 13 | 14 |
| 236 | 13 | 14 | 14 | 14 | 14 | 14 | 14 | 14 | 14 |
| 237 | 12 | 14 | 14 | 14 | 14 | 14 | 14 | 14 | 14 |
| 238 | 15 | 14 | 14 | 14 | 14 | 14 | 14 | 14 | 14 |
| 239 | 14 | 14 | 14 | 14 | 14 | 14 | 14 | 14 | 14 |
| 240 | 15 | 14 | 14 | 14 | 14 | 14 | 15 | 14 | 14 |
| 241 | 14 | 14 | 14 | 14 | 14 | 14 | 15 | 14 | 14 |
| 242 | 15 | 14 | 14 | 14 | 14 | 15 | 15 | 14 | 14 |
| 243 | 14 | 14 | 14 | 14 | 14 | 15 | 15 | 14 | 14 |
| 244 | 15 | 15 | 14 | 14 | 14 | 15 | 15 | 14 | 14 |

*FIG. 6G*

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 245 | 14 | 15 | 14 | 14 | 14 | 15 | 15 | 14 | 14 |
| 246 | 15 | 15 | 14 | 14 | 14 | 15 | 15 | 14 | 15 |
| 247 | 14 | 15 | 14 | 14 | 14 | 15 | 15 | 14 | 15 |
| 248 | 15 | 15 | 14 | 15 | 14 | 15 | 15 | 14 | 15 |
| 249 | 14 | 15 | 14 | 15 | 14 | 15 | 15 | 14 | 15 |
| 250 | 15 | 15 | 14 | 15 | 15 | 15 | 15 | 14 | 15 |
| 251 | 14 | 15 | 14 | 15 | 15 | 15 | 15 | 14 | 15 |
| 252 | 15 | 15 | 15 | 15 | 15 | 15 | 15 | 14 | 15 |
| 253 | 14 | 15 | 15 | 15 | 15 | 15 | 15 | 14 | 15 |
| 254 | 15 | 15 | 15 | 15 | 15 | 15 | 15 | 15 | 15 |
| 255 | 14 | 15 | 15 | 15 | 15 | 15 | 15 | 15 | 15 |

MINIMUM VALUE DECODING TABLE

| e | $_0^e\hat{V}$ | $_1^e\hat{V}$ | $_2^e\hat{V}$ | $_3^e\hat{V}$ | $_4^e\hat{V}$ | $_5^e\hat{V}$ | $_6^e\hat{V}$ | $_7^e\hat{V}$ | $_8^e\hat{V}$ |
|---|---|---|---|---|---|---|---|---|---|
| 0 | 0 | 0 | 0 | 0 | 0 | 0 | 0 | 0 | 0 |
| 1 | 1 | 6 | 14 | 10 | 12 | 4 | 2 | 16 | 8 |
| 2 | 34 | 22 | 30 | 26 | 28 | 20 | 18 | 32 | 24 |
| 3 | 35 | 40 | 48 | 44 | 46 | 38 | 36 | 50 | 42 |
| 4 | 68 | 56 | 64 | 60 | 62 | 54 | 52 | 66 | 58 |
| 5 | 69 | 74 | 82 | 78 | 80 | 72 | 70 | 84 | 76 |
| 6 | 102 | 90 | 98 | 94 | 96 | 88 | 86 | 100 | 92 |
| 7 | 103 | 108 | 116 | 112 | 114 | 106 | 104 | 118 | 110 |
| 8 | 137 | 124 | 132 | 128 | 130 | 122 | 120 | 134 | 126 |
| 9 | 136 | 142 | 150 | 146 | 148 | 140 | 138 | 152 | 144 |
| 10 | 171 | 158 | 166 | 162 | 164 | 156 | 154 | 168 | 160 |
| 11 | 170 | 176 | 184 | 180 | 182 | 174 | 172 | 186 | 178 |
| 12 | 205 | 192 | 200 | 196 | 198 | 190 | 188 | 202 | 194 |
| 13 | 204 | 210 | 218 | 214 | 216 | 208 | 206 | 220 | 212 |
| 14 | 239 | 226 | 234 | 230 | 232 | 224 | 222 | 236 | 228 |
| 15 | 238 | 244 | 252 | 248 | 250 | 242 | 240 | 254 | 246 |

FIG. 9A

510 → MAXIMUM VALUE DECODING TABLE

| e | $e\atop0\tilde{V}$ | $e\atop1\tilde{V}$ | $e\atop2\tilde{V}$ | $e\atop3\tilde{V}$ | $e\atop4\tilde{V}$ | $e\atop5\tilde{V}$ | $e\atop6\tilde{V}$ | $e\atop7\tilde{V}$ | $e\atop8\tilde{V}$ |
|---|---|---|---|---|---|---|---|---|---|
| 0 | 32 | 5 | 13 | 9 | 11 | 3 | 1 | 15 | 7 |
| 1 | 33 | 21 | 29 | 25 | 27 | 19 | 17 | 31 | 23 |
| 2 | 66 | 39 | 47 | 43 | 45 | 37 | 35 | 49 | 41 |
| 3 | 67 | 55 | 63 | 59 | 61 | 53 | 51 | 65 | 57 |
| 4 | 100 | 73 | 81 | 77 | 79 | 71 | 69 | 83 | 75 |
| 5 | 101 | 89 | 97 | 93 | 95 | 87 | 85 | 99 | 91 |
| 6 | 135 | 107 | 115 | 111 | 113 | 105 | 103 | 117 | 109 |
| 7 | 134 | 123 | 131 | 127 | 129 | 121 | 119 | 133 | 125 |
| 8 | 169 | 141 | 149 | 145 | 147 | 139 | 137 | 151 | 143 |
| 9 | 168 | 157 | 165 | 161 | 163 | 155 | 153 | 167 | 159 |
| 10 | 203 | 175 | 183 | 179 | 181 | 173 | 171 | 185 | 177 |
| 11 | 202 | 191 | 199 | 195 | 197 | 189 | 187 | 201 | 193 |
| 12 | 237 | 209 | 217 | 213 | 215 | 207 | 205 | 219 | 211 |
| 13 | 236 | 225 | 233 | 229 | 231 | 223 | 221 | 235 | 227 |
| 14 | 255 | 243 | 251 | 247 | 249 | 241 | 239 | 253 | 245 |
| 15 | 254 | 255 | 255 | 255 | 255 | 255 | 255 | 255 | 255 |

FIG. 9B

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 0 | 0 | 0 | 0 | 0 | 0 | 0 | 0 | 0 | 0 |
| 1 | 1 | 0 | 0 | 0 | 0 | 0 | 0 | 0 | 0 |
| 2 | 1 | 0 | 1 | 0 | 0 | 0 | 0 | 0 | 0 |
| 3 | 0 | 0 | 1 | 0 | 0 | 0 | 0 | 0 | 0 |
| 4 | 0 | 0 | 1 | 0 | 1 | 0 | 0 | 0 | 0 |
| 5 | 1 | 0 | 1 | 0 | 1 | 0 | 0 | 0 | 0 |
| 6 | 1 | 0 | 1 | 0 | 1 | 0 | 0 | 1 | 0 |
| 7 | 0 | 0 | 1 | 0 | 1 | 0 | 0 | 1 | 0 |
| 8 | 0 | 0 | 1 | 0 | 1 | 0 | 1 | 1 | 0 |
| 9 | 1 | 0 | 1 | 0 | 1 | 0 | 1 | 1 | 0 |
| 10 | 1 | 0 | 1 | 1 | 1 | 0 | 1 | 1 | 0 |
| 11 | 0 | 0 | 1 | 1 | 1 | 0 | 1 | 1 | 0 |
| 12 | 0 | 0 | 1 | 1 | 1 | 1 | 1 | 1 | 0 |
| 13 | 1 | 0 | 1 | 1 | 1 | 1 | 1 | 1 | 0 |
| 14 | 1 | 0 | 1 | 1 | 1 | 1 | 1 | 1 | 1 |
| 15 | 0 | 0 | 1 | 1 | 1 | 1 | 1 | 1 | 1 |
| 16 | 0 | 1 | 1 | 1 | 1 | 1 | 1 | 1 | 1 |
| 17 | 1 | 1 | 1 | 1 | 1 | 1 | 1 | 1 | 1 |
| 18 | 1 | 1 | 2 | 1 | 1 | 1 | 1 | 1 | 1 |
| 19 | 0 | 1 | 2 | 1 | 1 | 1 | 1 | 1 | 1 |
| 20 | 0 | 1 | 2 | 1 | 2 | 1 | 1 | 1 | 1 |
| 21 | 1 | 1 | 2 | 1 | 2 | 1 | 1 | 1 | 1 |
| 22 | 1 | 1 | 2 | 1 | 2 | 1 | 1 | 2 | 1 |
| 23 | 0 | 1 | 2 | 1 | 2 | 1 | 1 | 2 | 1 |
| 24 | 0 | 1 | 2 | 1 | 2 | 1 | 2 | 2 | 1 |
| 25 | 1 | 1 | 2 | 1 | 2 | 1 | 2 | 2 | 1 |
| 26 | 1 | 1 | 2 | 2 | 2 | 1 | 2 | 2 | 1 |
| 27 | 0 | 1 | 2 | 2 | 2 | 1 | 2 | 2 | 1 |
| 28 | 0 | 1 | 2 | 2 | 2 | 2 | 2 | 2 | 1 |
| 29 | 1 | 1 | 2 | 2 | 2 | 2 | 2 | 2 | 1 |
| 30 | 1 | 1 | 2 | 2 | 2 | 2 | 2 | 2 | 2 |
| 31 | 0 | 1 | 2 | 2 | 2 | 2 | 2 | 2 | 2 |
| 32 | 0 | 2 | 2 | 2 | 2 | 2 | 2 | 2 | 2 |
| 33 | 1 | 2 | 2 | 2 | 2 | 2 | 2 | 2 | 2 |
| 34 | 3 | 2 | 2 | 2 | 2 | 2 | 2 | 2 | 2 |

*FIG. 12A*

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 35 | 2 | 2 | 2 | 2 | 2 | 2 | 2 | 2 | 2 |
| 36 | 2 | 2 | 3 | 2 | 2 | 2 | 2 | 2 | 2 |
| 37 | 3 | 2 | 3 | 2 | 2 | 2 | 2 | 2 | 2 |
| 38 | 3 | 2 | 3 | 2 | 3 | 2 | 2 | 2 | 2 |
| 39 | 2 | 2 | 3 | 2 | 3 | 2 | 2 | 2 | 2 |
| 40 | 2 | 2 | 3 | 2 | 3 | 2 | 2 | 3 | 2 |
| 41 | 3 | 2 | 3 | 2 | 3 | 2 | 2 | 3 | 2 |
| 42 | 3 | 2 | 3 | 2 | 3 | 2 | 3 | 3 | 2 |
| 43 | 2 | 2 | 3 | 2 | 3 | 2 | 3 | 3 | 2 |
| 44 | 2 | 2 | 3 | 3 | 3 | 2 | 3 | 3 | 2 |
| 45 | 3 | 2 | 3 | 3 | 3 | 2 | 3 | 3 | 2 |
| 46 | 3 | 2 | 3 | 3 | 3 | 3 | 3 | 3 | 2 |
| 47 | 2 | 2 | 3 | 3 | 3 | 3 | 3 | 3 | 2 |
| 48 | 2 | 2 | 3 | 3 | 3 | 3 | 3 | 3 | 3 |
| 49 | 3 | 2 | 3 | 3 | 3 | 3 | 3 | 3 | 3 |
| 50 | 3 | 3 | 3 | 3 | 3 | 3 | 3 | 3 | 3 |
| 51 | 2 | 3 | 3 | 3 | 3 | 3 | 3 | 3 | 3 |
| 52 | 2 | 3 | 4 | 3 | 3 | 3 | 3 | 3 | 3 |
| 53 | 3 | 3 | 4 | 3 | 3 | 3 | 3 | 3 | 3 |
| 54 | 3 | 3 | 4 | 3 | 4 | 3 | 3 | 3 | 3 |
| 55 | 2 | 3 | 4 | 3 | 4 | 3 | 3 | 3 | 3 |
| 56 | 2 | 3 | 4 | 3 | 4 | 3 | 3 | 4 | 3 |
| 57 | 3 | 3 | 4 | 3 | 4 | 3 | 3 | 4 | 3 |
| 58 | 3 | 3 | 4 | 3 | 4 | 3 | 4 | 4 | 3 |
| 59 | 2 | 3 | 4 | 3 | 4 | 3 | 4 | 4 | 3 |
| 60 | 2 | 3 | 4 | 4 | 4 | 3 | 4 | 4 | 3 |
| 61 | 3 | 3 | 4 | 4 | 4 | 3 | 4 | 4 | 3 |
| 62 | 3 | 3 | 4 | 4 | 4 | 4 | 4 | 4 | 3 |
| 63 | 2 | 3 | 4 | 4 | 4 | 4 | 4 | 4 | 3 |
| 64 | 2 | 3 | 4 | 4 | 4 | 4 | 4 | 4 | 4 |
| 65 | 3 | 3 | 4 | 4 | 4 | 4 | 4 | 4 | 4 |
| 66 | 3 | 4 | 4 | 4 | 4 | 4 | 4 | 4 | 4 |
| 67 | 2 | 4 | 4 | 4 | 4 | 4 | 4 | 4 | 4 |
| 68 | 4 | 4 | 4 | 4 | 4 | 4 | 4 | 4 | 4 |
| 69 | 5 | 4 | 4 | 4 | 4 | 4 | 4 | 4 | 4 |

*FIG. 12B*

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 70 | 5 | 4 | 5 | 4 | 4 | 4 | 4 | 4 | 4 |
| 71 | 4 | 4 | 5 | 4 | 4 | 4 | 4 | 4 | 4 |
| 72 | 4 | 4 | 5 | 4 | 5 | 4 | 4 | 4 | 4 |
| 73 | 5 | 4 | 5 | 4 | 5 | 4 | 4 | 4 | 4 |
| 74 | 5 | 4 | 5 | 4 | 5 | 4 | 4 | 5 | 4 |
| 75 | 4 | 4 | 5 | 4 | 5 | 4 | 4 | 5 | 4 |
| 76 | 4 | 4 | 5 | 4 | 5 | 4 | 5 | 5 | 4 |
| 77 | 5 | 4 | 5 | 4 | 5 | 4 | 5 | 5 | 4 |
| 78 | 5 | 4 | 5 | 5 | 5 | 4 | 5 | 5 | 4 |
| 79 | 4 | 4 | 5 | 5 | 5 | 4 | 5 | 5 | 4 |
| 80 | 4 | 4 | 5 | 5 | 5 | 5 | 5 | 5 | 4 |
| 81 | 5 | 4 | 5 | 5 | 5 | 5 | 5 | 5 | 4 |
| 82 | 5 | 4 | 5 | 5 | 5 | 5 | 5 | 5 | 5 |
| 83 | 4 | 4 | 5 | 5 | 5 | 5 | 5 | 5 | 5 |
| 84 | 4 | 5 | 5 | 5 | 5 | 5 | 5 | 5 | 5 |
| 85 | 5 | 5 | 5 | 5 | 5 | 5 | 5 | 5 | 5 |
| 86 | 5 | 5 | 6 | 5 | 5 | 5 | 5 | 5 | 5 |
| 87 | 4 | 5 | 6 | 5 | 5 | 5 | 5 | 5 | 5 |
| 88 | 4 | 5 | 6 | 5 | 6 | 5 | 5 | 5 | 5 |
| 89 | 5 | 5 | 6 | 5 | 6 | 5 | 5 | 5 | 5 |
| 90 | 5 | 5 | 6 | 5 | 6 | 5 | 5 | 6 | 5 |
| 91 | 4 | 5 | 6 | 5 | 6 | 5 | 5 | 6 | 5 |
| 92 | 4 | 5 | 6 | 5 | 6 | 5 | 6 | 6 | 5 |
| 93 | 5 | 5 | 6 | 5 | 6 | 5 | 6 | 6 | 5 |
| 94 | 5 | 5 | 6 | 6 | 6 | 5 | 6 | 6 | 5 |
| 95 | 4 | 5 | 6 | 6 | 6 | 5 | 6 | 6 | 5 |
| 96 | 4 | 5 | 6 | 6 | 6 | 6 | 6 | 6 | 5 |
| 97 | 5 | 5 | 6 | 6 | 6 | 6 | 6 | 6 | 5 |
| 98 | 5 | 5 | 6 | 6 | 6 | 6 | 6 | 6 | 6 |
| 99 | 4 | 5 | 6 | 6 | 6 | 6 | 6 | 6 | 6 |
| 100 | 4 | 6 | 6 | 6 | 6 | 6 | 6 | 6 | 6 |
| 101 | 5 | 6 | 6 | 6 | 6 | 6 | 6 | 6 | 6 |
| 102 | 7 | 6 | 6 | 6 | 6 | 6 | 6 | 6 | 6 |
| 103 | 6 | 6 | 6 | 6 | 6 | 6 | 6 | 6 | 6 |
| 104 | 6 | 6 | 7 | 6 | 6 | 6 | 6 | 6 | 6 |

FIG. 12C

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 105 | 7 | 6 | 7 | 6 | 6 | 6 | 6 | 6 | 6 |
| 106 | 7 | 6 | 7 | 6 | 7 | 6 | 6 | 6 | 6 |
| 107 | 6 | 6 | 7 | 6 | 7 | 6 | 6 | 6 | 6 |
| 108 | 6 | 6 | 7 | 6 | 7 | 6 | 6 | 7 | 6 |
| 109 | 7 | 6 | 7 | 6 | 7 | 6 | 6 | 7 | 6 |
| 110 | 7 | 6 | 7 | 6 | 7 | 6 | 7 | 7 | 6 |
| 111 | 6 | 6 | 7 | 6 | 7 | 6 | 7 | 7 | 6 |
| 112 | 6 | 6 | 7 | 7 | 7 | 6 | 7 | 7 | 6 |
| 113 | 7 | 6 | 7 | 7 | 7 | 6 | 7 | 7 | 6 |
| 114 | 7 | 6 | 7 | 7 | 7 | 7 | 7 | 7 | 6 |
| 115 | 6 | 6 | 7 | 7 | 7 | 7 | 7 | 7 | 6 |
| 116 | 6 | 6 | 7 | 7 | 7 | 7 | 7 | 7 | 7 |
| 117 | 7 | 6 | 7 | 7 | 7 | 7 | 7 | 7 | 7 |
| 118 | 7 | 7 | 7 | 7 | 7 | 7 | 7 | 7 | 7 |
| 119 | 6 | 7 | 7 | 7 | 7 | 7 | 7 | 7 | 7 |
| 120 | 6 | 7 | 8 | 7 | 7 | 7 | 7 | 7 | 7 |
| 121 | 7 | 7 | 8 | 7 | 7 | 7 | 7 | 7 | 7 |
| 122 | 7 | 7 | 8 | 7 | 8 | 7 | 7 | 7 | 7 |
| 123 | 6 | 7 | 8 | 7 | 8 | 7 | 7 | 7 | 7 |
| 124 | 6 | 7 | 8 | 7 | 8 | 7 | 7 | 8 | 7 |
| 125 | 7 | 7 | 8 | 7 | 8 | 7 | 7 | 8 | 7 |
| 126 | 7 | 7 | 8 | 7 | 8 | 7 | 8 | 8 | 7 |
| 127 | 6 | 7 | 8 | 7 | 8 | 7 | 8 | 8 | 7 |
| 128 | 6 | 7 | 8 | 8 | 8 | 7 | 8 | 8 | 7 |
| 129 | 7 | 7 | 8 | 8 | 8 | 7 | 8 | 8 | 7 |
| 130 | 7 | 7 | 8 | 8 | 8 | 8 | 8 | 8 | 7 |
| 131 | 6 | 7 | 8 | 8 | 8 | 8 | 8 | 8 | 7 |
| 132 | 6 | 7 | 8 | 8 | 8 | 8 | 8 | 8 | 8 |
| 133 | 7 | 7 | 8 | 8 | 8 | 8 | 8 | 8 | 8 |
| 134 | 7 | 8 | 8 | 8 | 8 | 8 | 8 | 8 | 8 |
| 135 | 6 | 8 | 8 | 8 | 8 | 8 | 8 | 8 | 8 |
| 136 | 8 | 8 | 8 | 8 | 8 | 8 | 8 | 8 | 8 |
| 137 | 9 | 8 | 8 | 8 | 8 | 8 | 8 | 8 | 8 |
| 138 | 9 | 8 | 9 | 8 | 8 | 8 | 8 | 8 | 8 |
| 139 | 8 | 8 | 9 | 8 | 8 | 8 | 8 | 8 | 8 |

| COLOR | PIXEL TYPE | | | | | | | | |
|---|---|---|---|---|---|---|---|---|---|
| LEVEL V | 0 | 1 | 2 | 3 | 4 | 5 | 6 | 7 | 8 |
| 140 | 8 | 8 | 9 | 8 | 9 | 8 | 8 | 8 | 8 |
| 141 | 9 | 8 | 9 | 8 | 9 | 8 | 8 | 8 | 8 |
| 142 | 9 | 8 | 9 | 8 | 9 | 8 | 8 | 9 | 8 |
| 143 | 8 | 8 | 9 | 8 | 9 | 8 | 8 | 9 | 8 |
| 144 | 8 | 8 | 9 | 8 | 9 | 8 | 9 | 9 | 8 |
| 145 | 9 | 8 | 9 | 8 | 9 | 8 | 9 | 9 | 8 |
| 146 | 9 | 8 | 9 | 9 | 9 | 8 | 9 | 9 | 8 |
| 147 | 8 | 8 | 9 | 9 | 9 | 8 | 9 | 9 | 8 |
| 148 | 8 | 8 | 9 | 9 | 9 | 9 | 9 | 9 | 8 |
| 149 | 9 | 8 | 9 | 9 | 9 | 9 | 9 | 9 | 8 |
| 150 | 9 | 8 | 9 | 9 | 9 | 9 | 9 | 9 | 9 |
| 151 | 8 | 8 | 9 | 9 | 9 | 9 | 9 | 9 | 9 |
| 152 | 8 | 9 | 9 | 9 | 9 | 9 | 9 | 9 | 9 |
| 153 | 9 | 9 | 9 | 9 | 9 | 9 | 9 | 9 | 9 |
| 154 | 9 | 9 | 10 | 9 | 9 | 9 | 9 | 9 | 9 |
| 155 | 8 | 9 | 10 | 9 | 9 | 9 | 9 | 9 | 9 |
| 156 | 8 | 9 | 10 | 9 | 10 | 9 | 9 | 9 | 9 |
| 157 | 9 | 9 | 10 | 9 | 10 | 9 | 9 | 9 | 9 |
| 158 | 9 | 9 | 10 | 9 | 10 | 9 | 9 | 10 | 9 |
| 159 | 8 | 9 | 10 | 9 | 10 | 9 | 9 | 10 | 9 |
| 160 | 8 | 9 | 10 | 9 | 10 | 9 | 10 | 10 | 9 |
| 161 | 9 | 9 | 10 | 9 | 10 | 9 | 10 | 10 | 9 |
| 162 | 9 | 9 | 10 | 10 | 10 | 9 | 10 | 10 | 9 |
| 163 | 8 | 9 | 10 | 10 | 10 | 9 | 10 | 10 | 9 |
| 164 | 8 | 9 | 10 | 10 | 10 | 10 | 10 | 10 | 9 |
| 165 | 9 | 9 | 10 | 10 | 10 | 10 | 10 | 10 | 9 |
| 166 | 9 | 9 | 10 | 10 | 10 | 10 | 10 | 10 | 10 |
| 167 | 8 | 9 | 10 | 10 | 10 | 10 | 10 | 10 | 10 |
| 168 | 8 | 10 | 10 | 10 | 10 | 10 | 10 | 10 | 10 |
| 169 | 9 | 10 | 10 | 10 | 10 | 10 | 10 | 10 | 10 |
| 170 | 11 | 10 | 10 | 10 | 10 | 10 | 10 | 10 | 10 |
| 171 | 10 | 10 | 10 | 10 | 10 | 10 | 10 | 10 | 10 |
| 172 | 10 | 10 | 11 | 10 | 10 | 10 | 10 | 10 | 10 |
| 173 | 11 | 10 | 11 | 10 | 10 | 10 | 10 | 10 | 10 |
| 174 | 11 | 10 | 11 | 10 | 11 | 10 | 10 | 10 | 10 |

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 175 | 10 | 10 | 11 | 10 | 11 | 10 | 10 | 10 | 10 |
| 176 | 10 | 10 | 11 | 10 | 11 | 10 | 10 | 11 | 10 |
| 177 | 11 | 10 | 11 | 10 | 11 | 10 | 10 | 11 | 10 |
| 178 | 11 | 10 | 11 | 10 | 11 | 10 | 11 | 11 | 10 |
| 179 | 10 | 10 | 11 | 10 | 11 | 10 | 11 | 11 | 10 |
| 180 | 10 | 10 | 11 | 11 | 11 | 10 | 11 | 11 | 10 |
| 181 | 11 | 10 | 11 | 11 | 11 | 10 | 11 | 11 | 10 |
| 182 | 11 | 10 | 11 | 11 | 11 | 11 | 11 | 11 | 10 |
| 183 | 10 | 10 | 11 | 11 | 11 | 11 | 11 | 11 | 10 |
| 184 | 10 | 10 | 11 | 11 | 11 | 11 | 11 | 11 | 11 |
| 185 | 11 | 10 | 11 | 11 | 11 | 11 | 11 | 11 | 11 |
| 186 | 11 | 11 | 11 | 11 | 11 | 11 | 11 | 11 | 11 |
| 187 | 10 | 11 | 11 | 11 | 11 | 11 | 11 | 11 | 11 |
| 188 | 10 | 11 | 12 | 11 | 11 | 11 | 11 | 11 | 11 |
| 189 | 11 | 11 | 12 | 11 | 11 | 11 | 11 | 11 | 11 |
| 190 | 11 | 11 | 12 | 11 | 12 | 11 | 11 | 11 | 11 |
| 191 | 10 | 11 | 12 | 11 | 12 | 11 | 11 | 11 | 11 |
| 192 | 10 | 11 | 12 | 11 | 12 | 11 | 11 | 12 | 11 |
| 193 | 11 | 11 | 12 | 11 | 12 | 11 | 11 | 12 | 11 |
| 194 | 11 | 11 | 12 | 11 | 12 | 11 | 12 | 12 | 11 |
| 195 | 10 | 11 | 12 | 11 | 12 | 11 | 12 | 12 | 11 |
| 196 | 10 | 11 | 12 | 12 | 12 | 11 | 12 | 12 | 11 |
| 197 | 11 | 11 | 12 | 12 | 12 | 11 | 12 | 12 | 11 |
| 198 | 11 | 11 | 12 | 12 | 12 | 12 | 12 | 12 | 11 |
| 199 | 10 | 11 | 12 | 12 | 12 | 12 | 12 | 12 | 11 |
| 200 | 10 | 11 | 12 | 12 | 12 | 12 | 12 | 12 | 12 |
| 201 | 11 | 11 | 12 | 12 | 12 | 12 | 12 | 12 | 12 |
| 202 | 11 | 12 | 12 | 12 | 12 | 12 | 12 | 12 | 12 |
| 203 | 10 | 12 | 12 | 12 | 12 | 12 | 12 | 12 | 12 |
| 204 | 12 | 12 | 12 | 12 | 12 | 12 | 12 | 12 | 12 |
| 205 | 13 | 12 | 12 | 12 | 12 | 12 | 12 | 12 | 12 |
| 206 | 13 | 12 | 13 | 12 | 12 | 12 | 12 | 12 | 12 |
| 207 | 12 | 12 | 13 | 12 | 12 | 12 | 12 | 12 | 12 |
| 208 | 12 | 12 | 13 | 12 | 13 | 12 | 12 | 12 | 12 |
| 209 | 13 | 12 | 13 | 12 | 13 | 12 | 12 | 12 | 12 |

*FIG. 12F*

| COLOR LEVEL V | PIXEL TYPE ||||||||| 
|---|---|---|---|---|---|---|---|---|
| | 0 | 1 | 2 | 3 | 4 | 5 | 6 | 7 | 8 |
| 210 | 13 | 12 | 13 | 12 | 13 | 12 | 12 | 13 | 12 |
| 211 | 12 | 12 | 13 | 12 | 13 | 12 | 12 | 13 | 12 |
| 212 | 12 | 12 | 13 | 12 | 13 | 12 | 13 | 13 | 12 |
| 213 | 13 | 12 | 13 | 12 | 13 | 12 | 13 | 13 | 12 |
| 214 | 13 | 12 | 13 | 13 | 13 | 12 | 13 | 13 | 12 |
| 215 | 12 | 12 | 13 | 13 | 13 | 12 | 13 | 13 | 12 |
| 216 | 12 | 12 | 13 | 13 | 13 | 13 | 13 | 13 | 12 |
| 217 | 13 | 12 | 13 | 13 | 13 | 13 | 13 | 13 | 12 |
| 218 | 13 | 12 | 13 | 13 | 13 | 13 | 13 | 13 | 13 |
| 219 | 12 | 12 | 13 | 13 | 13 | 13 | 13 | 13 | 13 |
| 220 | 12 | 13 | 13 | 13 | 13 | 13 | 13 | 13 | 13 |
| 221 | 13 | 13 | 13 | 13 | 13 | 13 | 13 | 13 | 13 |
| 222 | 13 | 13 | 14 | 13 | 13 | 13 | 13 | 13 | 13 |
| 223 | 12 | 13 | 14 | 13 | 13 | 13 | 13 | 13 | 13 |
| 224 | 12 | 13 | 14 | 13 | 14 | 13 | 13 | 13 | 13 |
| 225 | 13 | 13 | 14 | 13 | 14 | 13 | 13 | 13 | 13 |
| 226 | 13 | 13 | 14 | 13 | 14 | 13 | 13 | 14 | 13 |
| 227 | 12 | 13 | 14 | 13 | 14 | 13 | 13 | 14 | 13 |
| 228 | 12 | 13 | 14 | 13 | 14 | 13 | 14 | 14 | 13 |
| 229 | 13 | 13 | 14 | 13 | 14 | 13 | 14 | 14 | 13 |
| 230 | 13 | 13 | 14 | 14 | 14 | 13 | 14 | 14 | 13 |
| 231 | 12 | 13 | 14 | 14 | 14 | 13 | 14 | 14 | 13 |
| 232 | 12 | 13 | 14 | 14 | 14 | 14 | 14 | 14 | 13 |
| 233 | 13 | 13 | 14 | 14 | 14 | 14 | 14 | 14 | 13 |
| 234 | 13 | 13 | 14 | 14 | 14 | 14 | 14 | 14 | 14 |
| 235 | 12 | 13 | 14 | 14 | 14 | 14 | 14 | 14 | 14 |
| 236 | 12 | 14 | 14 | 14 | 14 | 14 | 14 | 14 | 14 |
| 237 | 13 | 14 | 14 | 14 | 14 | 14 | 14 | 14 | 14 |
| 238 | 15 | 14 | 14 | 14 | 14 | 14 | 14 | 14 | 14 |
| 239 | 14 | 14 | 14 | 14 | 14 | 14 | 14 | 14 | 14 |
| 240 | 14 | 14 | 15 | 14 | 14 | 14 | 14 | 14 | 14 |
| 241 | 15 | 14 | 15 | 14 | 14 | 14 | 14 | 14 | 14 |
| 242 | 15 | 14 | 15 | 14 | 15 | 14 | 14 | 14 | 14 |
| 243 | 14 | 14 | 15 | 14 | 15 | 14 | 14 | 14 | 14 |
| 244 | 14 | 14 | 15 | 14 | 15 | 14 | 14 | 15 | 14 |

*FIG. 12G*

| COLOR LEVEL V | PIXEL TYPE | | | | | | | | |
|---|---|---|---|---|---|---|---|---|---|
| | 0 | 1 | 2 | 3 | 4 | 5 | 6 | 7 | 8 |
| 245 | 15 | 14 | 15 | 14 | 15 | 14 | 14 | 15 | 14 |
| 246 | 15 | 14 | 15 | 14 | 15 | 14 | 15 | 15 | 14 |
| 247 | 14 | 14 | 15 | 14 | 15 | 14 | 15 | 15 | 14 |
| 248 | 14 | 14 | 15 | 15 | 15 | 14 | 15 | 15 | 14 |
| 249 | 15 | 14 | 15 | 15 | 15 | 14 | 15 | 15 | 14 |
| 250 | 15 | 14 | 15 | 15 | 15 | 15 | 15 | 15 | 14 |
| 251 | 14 | 14 | 15 | 15 | 15 | 15 | 15 | 15 | 14 |
| 252 | 14 | 14 | 15 | 15 | 15 | 15 | 15 | 15 | 15 |
| 253 | 15 | 14 | 15 | 15 | 15 | 15 | 15 | 15 | 15 |
| 254 | 15 | 15 | 15 | 15 | 15 | 15 | 15 | 15 | 15 |
| 255 | 14 | 15 | 15 | 15 | 15 | 15 | 15 | 15 | 15 |

| e | $^e_0\hat{V}$ | $^e_1\hat{V}$ | $^e_2\hat{V}$ | $^e_3\hat{V}$ | $^e_4\hat{V}$ | $^e_5\hat{V}$ | $^e_6\hat{V}$ | $^e_7\hat{V}$ | $^e_8\hat{V}$ |
|---|---|---|---|---|---|---|---|---|---|
| 0 | 0 | 0 | 0 | 0 | 0 | 0 | 0 | 0 | 0 |
| 1 | 1 | 16 | 2 | 10 | 4 | 12 | 8 | 6 | 14 |
| 2 | 35 | 32 | 18 | 26 | 20 | 28 | 24 | 22 | 30 |
| 3 | 34 | 50 | 36 | 44 | 38 | 46 | 42 | 40 | 48 |
| 4 | 68 | 66 | 52 | 60 | 54 | 62 | 58 | 56 | 64 |
| 5 | 69 | 84 | 70 | 78 | 72 | 80 | 76 | 74 | 82 |
| 6 | 103 | 100 | 86 | 94 | 88 | 96 | 92 | 90 | 98 |
| 7 | 102 | 118 | 104 | 112 | 106 | 114 | 110 | 108 | 116 |
| 8 | 136 | 134 | 120 | 128 | 122 | 130 | 126 | 124 | 132 |
| 9 | 137 | 152 | 138 | 146 | 140 | 148 | 144 | 142 | 150 |
| 10 | 171 | 168 | 154 | 162 | 156 | 164 | 160 | 158 | 166 |
| 11 | 170 | 186 | 172 | 180 | 174 | 182 | 178 | 176 | 184 |
| 12 | 204 | 202 | 188 | 196 | 190 | 198 | 194 | 192 | 200 |
| 13 | 205 | 220 | 206 | 214 | 208 | 216 | 212 | 210 | 218 |
| 14 | 239 | 236 | 222 | 230 | 224 | 232 | 228 | 226 | 234 |
| 15 | 238 | 254 | 240 | 248 | 242 | 250 | 246 | 244 | 252 |

Table 700: MINIMUM VALUE DECODING TABLE

| MAXIMUM VALUE DECODING TABLE ||||||||||
|---|---|---|---|---|---|---|---|---|
| e | $\hat{V}^e_0$ | $\hat{V}^e_1$ | $\hat{V}^e_2$ | $\hat{V}^e_3$ | $\hat{V}^e_4$ | $\hat{V}^e_5$ | $\hat{V}^e_6$ | $\hat{V}^e_7$ | $\hat{V}^e_8$ |
| 0 | 32 | 15 | 1 | 9 | 3 | 11 | 7 | 5 | 13 |
| 1 | 33 | 31 | 17 | 25 | 19 | 27 | 23 | 21 | 29 |
| 2 | 67 | 49 | 35 | 43 | 37 | 45 | 41 | 39 | 47 |
| 3 | 66 | 65 | 51 | 59 | 53 | 61 | 57 | 55 | 63 |
| 4 | 100 | 83 | 69 | 77 | 71 | 79 | 75 | 73 | 81 |
| 5 | 101 | 99 | 85 | 93 | 87 | 95 | 91 | 89 | 97 |
| 6 | 135 | 117 | 103 | 111 | 105 | 113 | 109 | 107 | 115 |
| 7 | 134 | 133 | 119 | 127 | 121 | 129 | 125 | 123 | 131 |
| 8 | 168 | 151 | 137 | 145 | 139 | 147 | 143 | 141 | 149 |
| 9 | 169 | 167 | 153 | 161 | 155 | 163 | 159 | 157 | 165 |
| 10 | 203 | 185 | 171 | 179 | 173 | 181 | 177 | 175 | 183 |
| 11 | 202 | 201 | 187 | 195 | 189 | 197 | 193 | 191 | 199 |
| 12 | 236 | 219 | 205 | 213 | 207 | 215 | 211 | 209 | 217 |
| 13 | 237 | 235 | 221 | 229 | 223 | 231 | 227 | 225 | 233 |
| 14 | 255 | 253 | 239 | 247 | 241 | 249 | 245 | 243 | 251 |
| 15 | 254 | 255 | 255 | 255 | 255 | 255 | 255 | 255 | 255 |

*FIG. 13B*

SYSTEMS AND METHODS FOR IMAGE DATA ENCODING AND DECODING

BACKGROUND

The present exemplary embodiment relates to image processing systems and more particularly to improved image data encoding and decoding. In copiers, printers, and other document processing systems, print jobs are received from a network or from a scanner, and the image is rendered such as by printing onto paper or other printable media. In the case of color images, the incoming job often includes a number of CMYK values associated with each pixel position, for instance Cyan, Magenta, and Yellow values for three different colors and a darkness value (K), where the incoming digital data values are of a certain bit resolution, such as four 8-bit data values indicating one of 256 possible values for C, M, Y, and K. When a color image is to be rendered, the image data is obtained from a frame buffer memory that stores the image data at an output device resolution, where storage of the frame buffer data at 8-bits per data value can lead to excessive frame buffer memory size requirements, particularly for high resolution printing systems. Accordingly, there is a need for encoding techniques and systems allowing compression of incoming image data to provide 4-bit encoded image data values for storage in a frame buffer and for decoding back to 8-bit data values for rendering.

BRIEF DESCRIPTION

In the present disclosure, methods and systems are provided for image processing using an encoding technique to encode 8-bit input image pixel data values as 4-bit values in which the incoming image data is tiled using a 3×9 tiling pattern of repeating 3×3 data windows with 9 unique pixel types, with each pixel being encoded with a 4-bit value based on its pixel type and the 8-bit source value, with the encoded 4-bit image data being stored. A decoder decides the data into 8-bit format according to the surrounding neighbor pixels in the 3×3 sliding window to determine the value of the center pixel using the range of the surrounding pixel data values to ascertain the possible range of the pixel being decoded to facilitate lossless recreation of bi-level image data in which the decoded value of the center pixel is equal to the source value if all the original pixels within the 3×3 sliding data window have the same value. The disclosed image data processing techniques may be advantageously employed for simple data encoding and decoding that may find particular utility in efficient hardware implementations for document processing system applications and other situations where color image data is to be rendered.

In accordance with one or more aspects of the present disclosure, a method is provided for 8-bit color image data processing. 8-bit input color image data is received and a pixel type value is assigned to each 8-bit pixel data value based on a 9×3 tiling pattern, where the 9×3 tiling pattern has 9 unique pixel type values in each 3×3 window thereof. The individual 8-bit input values are encoded according to the 8-bit data value and the assigned pixel type value using an encoding table to provide 4-bit encoded color image data values. The table has 256 rows each including a unique set of 9 4-bit data value entries individually corresponding to one of the 9 unique pixel type values, and 9 columns corresponding to the 9 unique pixel type values with 8 of the 9 columns having clustered values and the ninth column having 8 groups of two values. In exemplary implementations, the encoding table may be Gray coded with each row differing from the previous row by exactly one entry.

The method also provides for decoding individual 4-bit values according to the data value and the assigned pixel type for the current pixel and its neighboring pixels in a 3×3 window surrounding the current pixel to provide 8-bit decoded color image data values. This includes determining minimum and maximum 8-bit values from the encoding table for each neighboring pixel according to the pixel type and 4-bit encoded pixel data, identifying the highest minimum 8-bit value and the lowest maximum 8-bit value for the neighboring pixels, and computing a decoded 8-bit data value for the current pixel based at least partially on the highest minimum 8-bit value and the lowest maximum 8-bit value for the neighboring pixels. In some embodiments, the computation may include averaging the highest minimum and the lowest maximum 8-bit values, where the computed value may be rounded up or down based on the value of the ninth column of the encoder table. Moreover, certain exemplary embodiments may utilize minimum and maximum value decoding tables with 16 rows having a unique set of nine 8-bit minimum and maximum value entries corresponding to the 9 pixel type values, respectively. In addition, the method may further include printing the 8-bit decoded color image data values.

Additional aspects of the present disclosure relate to an image processing system, which is comprised of a rendering engine, such as a print engine, display device, etc. in certain embodiments, as well as a controller that receives 8-bit input color image data and which includes an encoder, a frame buffer, and a decoder. The encoder assigns a pixel type value to each 8-bit pixel data value based on a 9×3 tiling pattern that has nine unique pixel type values in each 3×3 window thereof, and the encoder provides an encoding table that has 256 rows, each of which including a unique set of 9 4-bit data value entries individually corresponding to one of the 9 unique pixel type values. The table includes 9 columns corresponding to the pixel type values, 8 eight of which having clustered values and the ninth having eight groups of two values, and may be implemented by storage of an array of encoder table values in a controller memory or may be implemented as a series of equations. The encoder operates to encode individual 8-bit input color image data values using the encoder table according to the data and pixel type in order to provide 4-bit encoded color image data values.

The system further includes a frame buffer that stores the encoded image data, as well as a decoder to provide 8-bit decoded color image data values by decoding the individual 4-bit values based on the 4-bit value and the assigned pixel type value for a current pixel and its neighboring pixels in a 3×3 window. The decoder determines minimum and maximum 8-bit values from the encoding table for each neighboring pixel according to the pixel type and 4-bit encoded pixel data, identifies the highest minimum 8-bit value and the lowest maximum 8-bit value for the neighboring pixels, and computes a decoded 8-bit data value for the current pixel based at least partially on the highest minimum 8-bit value and the lowest maximum 8-bit value for the neighboring pixels. In one exemplary implementation, the decoder excludes the minimum and maximum values associated with neighboring pixels for which a range between the minimum and maximum values does not overlap a range between the minimum and maximum values for the current pixel.

Still further aspects of the disclosure provide an encoding and decoding system, which comprises a 8-bit to 4-bit encoder that assigns a pixel type value to each received 8-bit pixel data value based on a 9×3 tiling pattern, and provides an encoding table having 256 and 9 columns corresponding to the 9 unique pixel type values, in which eight columns include clustered values and the ninth column has 8 groups of two values, where the encoder table may be Gray coded. The 8-bit input data values are encoded using the encoder table according to the 8-bit data value and the assigned pixel type value to provide 4-bit encoded color image data values. The system also includes a 4-bit to 8-bit decoder that performs decoding for a current pixel at least partially according to its neighboring pixels by determining minimum and maximum 8-bit values from the encoding table for each neighboring pixel according to the pixel type and 4-bit encoded pixel data, identifying the highest minimum 8-bit value and the lowest maximum 8-bit value for the neighboring pixels, and computing a decoded 8-bit data value for the current pixel based at least partially on the highest minimum 8-bit value and the lowest maximum 8-bit value for the neighboring pixels.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

FIGS. 6A-6H are schematic diagrams illustrating an exemplary 8-bit to 4-bit color image data encoder table in accordance with the first encoder embodiment of the present disclosure;

FIG. 8 is a schematic diagram illustrating the relative positions of encoded color image data values for a given pixel type and neighboring pixels;

FIGS. 9A and 9B are schematic diagrams illustrating minimum and maximum value decoding tables, respectively, in the first decoding embodiment;

FIGS. 12A-12H are schematic diagrams illustrating another exemplary 8-bit to 4-bit color image data encoder table in accordance with a second encoder embodiment according to the present disclosure; and FIGS. 13A and 13B are schematic diagrams illustrating minimum and maximum value decoding tables, respectively, in a second decoding embodiment in accordance with the present disclosure.

DETAILED DESCRIPTION

Figure 1:
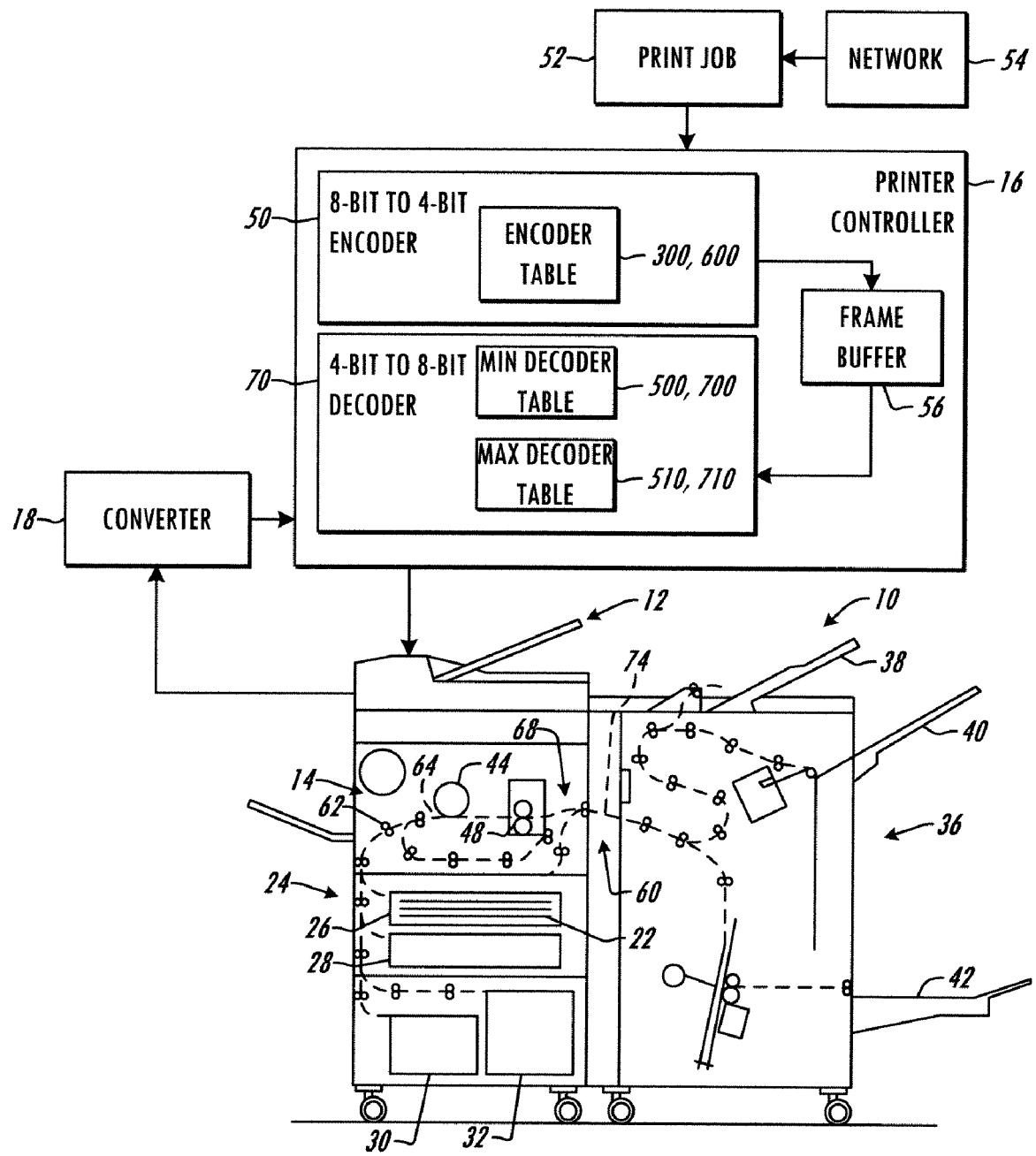
FIG. 1 is a schematic system level diagram illustrating an exemplary document processing system with a printer controller having 8-bit to 4-bit encoder and 4-bit to 8-bit decoder components in accordance with various aspects of the present disclosure.

FIG. 1 illustrates a document processing or printing system 10 having an exemplary controller 16 with an 8-bit to 4-bit encoder 50 and a 4-bit to 8-bit decoder according to various aspects of the present disclosure. Although illustrated and described hereinafter in the context of the exemplary document processing system 10 in which color images are printed on a printable media, the various aspects of the disclosure find utility in association with any image processing system, such as in systems for visually rendering color image data on a display. The exemplary printing system 10 can be any form of commercial printing apparatus, copier, printer, facsimile machine, or other system having a scanner or other input device 12 that scans an original document text and/or images to create input color image data values comprising pixel values indicative of the colors and/or brightness of areas of the scanned original, and/or which receives print jobs including such input color image data as part of a print job 52 received from a network 54.

The system 10 also includes rendering components such as one or more marking engines or print engines 14 by which visual images, graphics, text, etc. are printed on a page or other printable medium, including xerographic, electro photographic, and other types of printing technology, wherein such components are not specifically illustrated to avoid obscuring the various alternate imaging features of the present disclosure. The print engine 14 may be any device or marking apparatus for applying an image from a printer controller 16 to printable media (print media) such as a physical sheet of paper, plastic, or other suitable physical media substrate for images, whether precut or web fed, where the input device 12, print engine 14, and controller 16 are interconnected by wired and/or wireless links for transfer of electronic data therebetween, including but not limited to telephone lines, computer cables, ISDN lines, etc. The print engine 14 generally includes hardware and software elements employed in the creation of desired images by electrophotographic processes wherein suitable print engines may also include ink-jet printers, such as solid ink printers, thermal head printers that are used in conjunction with heat sensitive paper, and other devices capable of printing an image on a printable media.

The image input device 12 may include or be operatively coupled with a converter 18 for converting the image-bearing documents to image signals or pixels. In the illustrated embodiment, for example, the system 10 includes an analyzer component 18, which can be any suitable hardware, software, logic, or combinations thereof, whether implemented as a single component or as multiple interoperative components operatively interfaced with the image input device 12 to convert scanned image data (e.g., RGB) to an 8-bit format compatible with the print engine 14 (e.g., CMYK in the illustrated embodiment).

The document processing system 10 further includes a printer controller 16 operatively associated with the scanner 12, the network 54, and the print engine 14 for controlling operation of the output devices such as print engine(s) of the system 10 and to perform the encoding, frame buffer data storage, and decoding functionality illustrated and described hereinafter. As shown in FIG. 1, the controller 16 comprises an 8-bit to 4-bit encoder, a frame buffer memory 56, and a 4-bit to 8-bit decoder 70. The encoder 50 and the decider 70 may be implemented in any suitable form of hardware, software, firmware, logic or combinations thereof, whether unitary or distributed, and the frame buffer 56 may be any suitable form of electronic memory. In one embodiment, the encoder 50 includes an encoder table 300, 600, which may be any suitable form of programmed memory that provides table data value entries such as those shown in FIGS. 6A-6H (table 300) and 12A-12H (table 600) below or the table may be implemented in logic as encoder equations 50a-50h and 51 as shown below in FIG. 5. The decoder 70 operates to decode 4-bit data values from the frame buffer 56 into 8-bit format, and may be operative to use the encoder table 50 or may optionally include minimum and maximum value tables 500, 700 and 510, 710, respectively, examples of which are illustrated and described below in connection with FIGS. 9A, 9B, and 13A, 13B below.

For incoming print jobs 52, the controller 16 provides decoded 8-bit CMYK pixel data to the print engine 14 that is fed with a print media sheets 22 from a feeding source 24 such as a paper feeder which can have one or more print media sources or paper trays 26, 28, 30, 32, each storing sheets of the same or different types of print media 22 on which the marking engine 14 can print. The exemplary print engine 14 includes an imaging component 44 and an associated fuser 48, which may be of any suitable form or type, and may include further components which are omitted from the figure so as not to obscure the various aspects of the present disclosure. For instance, the printing engine 14 may include a photoconductive insulating member which is charged to a uniform potential and exposed to a light image of an original document to be reproduced. The exposure discharges the photoconductive insulating surface in exposed or background areas and creates an electrostatic latent image on the member corresponding to image areas of the original document. The electrostatic latent image on the photoconductive insulating surface is made visible by developing the image with an imaging material such as a developing powder comprising toner particles, which is then transferred to the print media and permanently affixed in the fusing process.

In a multicolor electrophotographic process, successive latent images corresponding to different colors can be formed on the insulating member and developed with a respective toner of a complementary color, with each color toner image being successively transferred to the paper sheet in superimposed registration with the prior toner image to create a multi-layered toner image on the printed media 22, and where the superimposed images may be fused contemporaneously, in a single fusing process. The fuser 48 receives the imaged print media from the image-forming component and fixes the toner image transferred to the surface of the print media 22, where the fuser 48 can be of any suitable type, and may include fusers which apply heat or both heat and pressure to an image. Printed media from the printing engine 14 is delivered to a finisher 36 including one or more finishing output destinations 38, 40, 42 such as trays, stackers, pans, etc. A print media transporting system or network or highway 60 of the document processing system 10 links the print media source 24, the print or marking engine 14 and a finisher 36 via a network of flexible automatically feeding and collecting drive members, such as pairs of rollers 62, spherical nips, air jets, or the like, along with various motors for the drive members, belts, guide rods, frames, etc. (not shown), which, in combination with the drive members, serve to convey the print media along selected pathways at selected speeds. In the illustrated embodiments, print media 22 is delivered from the source 24 to the print engine 14 via a pathway 64 common to the input trays 26, 28, 30, 32, and is printed by the imaging component 44 and fused by the fuser 48, with a pathway 68 from the printer 14 merging into a pathway 74 which conveys the printed media to the finisher 36, where the pathways 64, 68, 74 of the network 60 may include inverters, reverters, interposers, bypass pathways, and the like as known in the art. In addition, the print engine 14 may be configured for duplex or simplex printing and a single sheet of paper 22 may be marked by two or more print engines 14 or may be marked a plurality of times by the same marking engine 14, for instance, using internal duplex pathways.

The document processing system 10 is operative to perform these scanning and printing tasks in the execution of print jobs, which can include printing selected text, line graphics, images, machine ink character recognition (MICR) notation, etc., on either or both of the front and back sides or pages of one or more media sheets 22. An original document or image or print job or jobs can be supplied to the printing system 10 in various ways. In one example, the built-in optical scanner 12 may be used to scan a document such as book pages, a stack of printed pages, or so forth, to create a digital image of the scanned document that is reproduced by printing operations performed by the printing system 10 via the data transform functionality as described herein. Alternatively, print jobs 52 can be electronically delivered to the system controller 16 via the network 54 or through other means, for instance, whereby a network user can print a document from word processing software running on a network computer or otherwise provide color image data to the controller 16, thereby generating an input print job 52, wherein the herein described encoding and decoding techniques are advantageously employed in the exemplary print controller 16 to encode incoming 8-bit color image data to 4-bit format for compact and efficient storage in the frame buffer 56 and to thereafter decide the 4-bit data into 8-bit format suitable for provision to the print engine 14 or other rendering device within the scope of the present disclosure.

Figure 2:
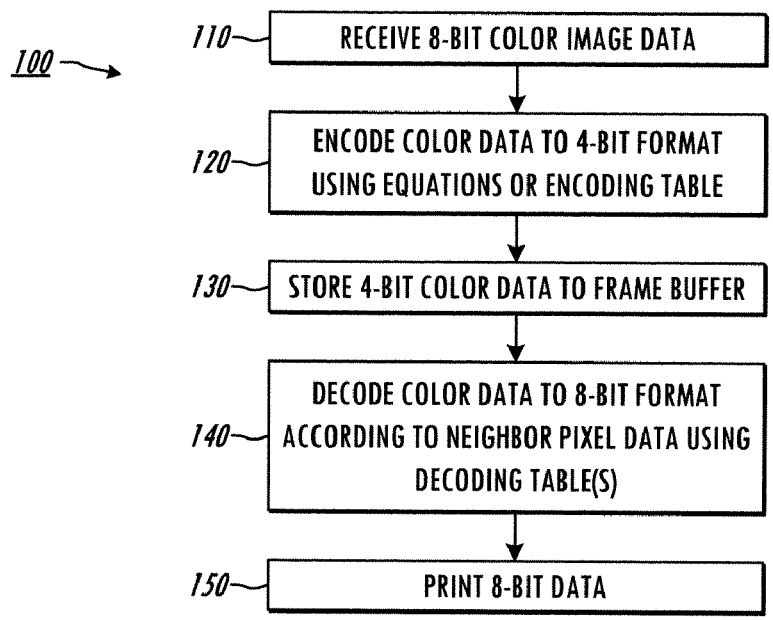
FIG. 2 is a flow diagram illustrating an exemplary method for receiving, encoding, storing, decoding, and printing color image data in accordance with the present disclosure.

FIG. 2 illustrates an exemplary method 100 for image data processing in accordance with one or more aspects of the disclosure. It is noted that while the exemplary methods are illustrated and described hereinafter in the form of a series of acts or events, the various methods in the claims below are not limited by the illustrated ordering of such acts or events except as specifically set forth therein. In this regard, except as specifically provided in the claims, some acts or events may occur in different order and/or concurrently with other acts or events apart from those acts and ordering illustrated and described herein, and not all illustrated steps may be required to implement a process or method in accordance with the present disclosure. The methods, moreover, may be implemented in hardware, software, or combinations thereof, in order to provide the described functionality, wherein these methods can be practiced in hardware and/or software of the above described systems or other hardware and/or software operatively associated with a printing or other image rendering system, wherein the disclosure is not limited to the specific applications and implementations illustrated and described herein.

The method 100 begins in FIG. 2 at 110 with receipt of 8-bit color image data. The input color image data can be any suitable 8-bit format, such as CMYK values that comprise four 8-bit (byte) data for each of the C, M, Y, and K values corresponding to a particular pixel in the input image, wherein the disclosure is not limited to CMYK or any other specific format of the 8-bit input color image data. The received input color image data is then encoded at 120 to create encoded 4-bit image data values using the encoding table, which can be in the form of equations and/or a table of value entries as shown and described further below. At 130, the encoded 4-bit image data is stored into the frame buffer memory (frame buffer 56 in FIG. 1 above). Prior to rendering the image, the encoded 4-bit data is then decoded at 140 to provided 8-bit decoded image data values according to the neighbor pixel data using either dedicated decoding tables or based on value range information obtained from the encoding table. Thereafter, the decoded 8-bit data is printed or otherwise rendered at 150.

Figure 3:
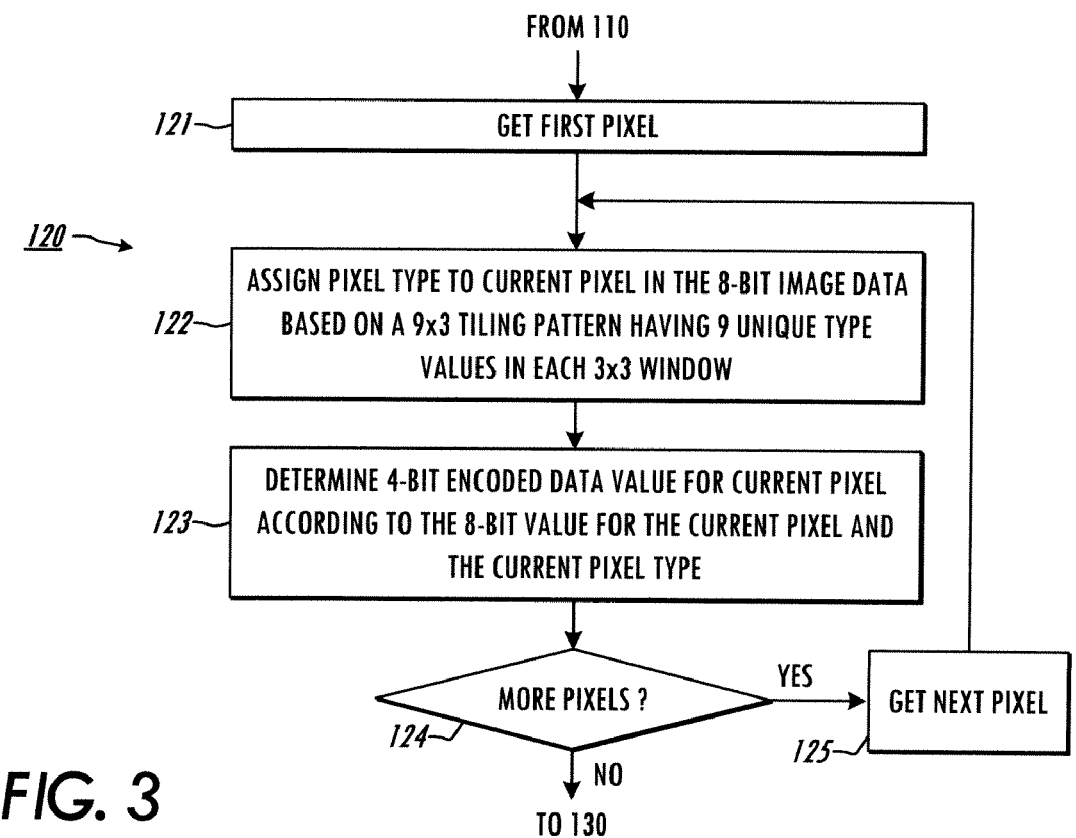
FIG. 3 is a flow diagram illustrating further details of the data encoding of FIG. 2.
Figures 4, 5:
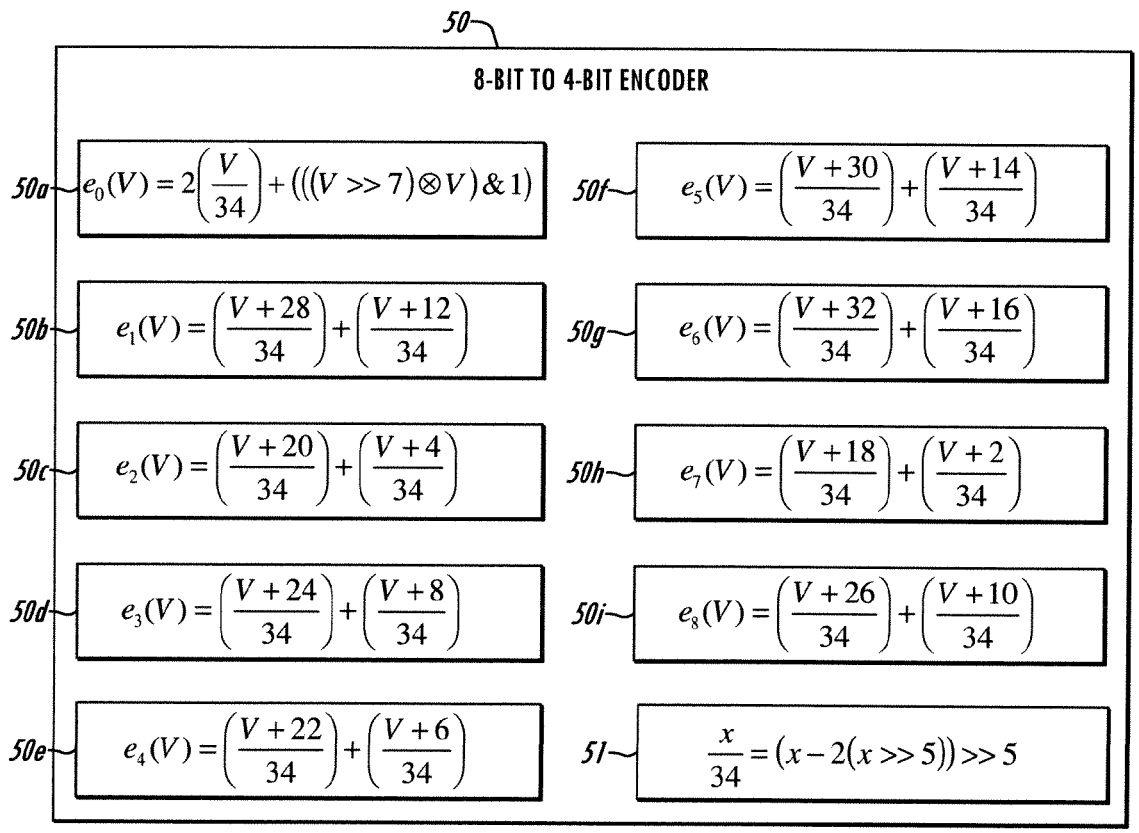
FIG. 4 is a schematic diagram illustrating an exemplary frame buffer color image data storage arrangement using a 3×9 pixel type tiling pattern replicated across the frame buffer, with an exemplary 3×3 sliding window used to evaluate the window's center pixel.
FIG. 5 is a schematic diagram illustrating an exemplary set of equations for a first embodiment of an 8-bit to 4-bit encoder in accordance with the present disclosure.

Referring also to FIGS. 3 and 4, FIG. 3 illustrates further details of the 8-bit to 4-bit color image data encoding 120 of FIG. 2, which is implemented in the exemplary encoder 50 in the system 10 of FIG. 1, beginning with a first pixel at 121. The encoding and decoding are performed on a pixel-by-pixel basis for each of the C, M, Y, and K data values, wherein such are not described separately to avoid obscuring the features of the present disclosure. At 122, a pixel type value is assigned to the current pixel of the 8-bit image data based on a 9×3 tiling pattern.

FIG. 4 shows an exemplary color image data storage arrangement 200 using a 3×9 pixel type tiling pattern 202 replicated across the frame buffer, with an exemplary 3×3 sliding window 204 used to evaluate the window's center pixel for encoding and decoding purposes in the illustrated embodiments, wherein the tiling pattern 202 has 9 unique pixel type values (0 through 8 in the illustrated example) in each 3×3 window 204 thereof. Based upon this, each input pixel data value is assigned a type value by the encoder 50 at 122 in FIG. 3. At 123, the encoding further includes encoding the individual 8-bit input color image data values using an encoder table according to the 8-bit data value of the current pixel and the assigned current pixel type value to provide an encoded 4-bit color image data value. This encoded value may then be stored in the frame buffer memory 56 in FIG. 1, and a determination is made at 124 as to whether more pixels remain for encoding. If so (YES at 124), the encoding proceeds to the next pixel data value at 125 and repeats the process at 122-124 as described above until all the data values (e.g., C, M, Y, and K) have been encoded for all the pixels (NO at 124), and the process proceeds to 130 in FIG. 2 as described above.

Referring also to FIGS. 5 and 6A-6H, the exemplary 8-bit to 4-bit encoding is preferably performed using an encoding table having 256 rows corresponding to each possible 8-bit data value and at least nine columns corresponding to the nine unique pixel type values. A first encoding embodiment is shown in FIGS. 5-6H and a second gray-coded embodiment is depicted in FIGS. 12A-12H below. In operation of the first embodiment, the encoder 50 encodes individual 8-bit input color image data values using the encoder table (equations 50a-50i of FIG. 5 or the array 300 of FIGS. 6A-6H) according to the 8-bit data value and the assigned pixel type value to provide 4-bit encoded color image data values. The 4-bit encoded image data values may then be stored in the frame buffer 56.

FIG. 5 shows one implementation in which the encoding table is embodied by a set of equations or formulas 50a-50i corresponding to the nine pixel type values 0 through 8 for a first embodiment of an 8-bit to 4-bit encoder table in accordance with the present disclosure. In this equation-based implementation of the first embodiment, the 8-bit data value of the current pixel is represented by the variable "V", wherein the notation ">>" is a Boolean right shift by the indicated number of bits (e.g., V>>7 is the data value "V" right shifted by seven bits), and the circled "X" operator represents a Boolean exclusive-OR operation. In order to facilitate efficient implementation in hardware, equation 51 may be evaluated for use in the divisions by 34 in equations 50a-50i for all "x" values from zero through 543. In operation, a particular 4-bit encoded value is computed using the appropriate one of the table equations 50a-50i according to the assigned pixel type value, using the 8-bit value for "V".

FIGS. 6A-6H show another implementation of an encoder table 300 in the first embodiment. In this case, the table 300 is depicted as an array of 4-bit value entries (shown in the figures as decimal entries for clarity), which can be stored in any suitable form in the encoder 50 to allow indexing to a particular one of the 256 rows according to the current 8-bit value. Once the corresponding row is identified, the encoder obtains the encoded 4-bit value entry from the column corresponding to the assigned pixel type value.

In the first embodiment of the encoder table, whether implemented as equations 50a-50i in FIG. 5 or stored as an array 300 as shown in FIGS. 6A-6H, the encoder table comprises 256 rows with each row including a unique set of 9 4-bit data value entries individually corresponding to one of the 9 unique pixel type values. As best shown in FIGS. 6A-6H, moreover, the table provides nine columns that correspond to the pixel type values, in which 8 of the 9 columns (e.g., columns for pixel types 1 through 8) have clustered values. For instance, all the "0" values in the pixel type 4 column (FIG. 6A) are grouped together in a cluster in rows 0 through 11, all the "1" values are grouped in a cluster in rows 12-27, etc., where the entries in columns 1 through 8 are similarly clustered. In addition, the ninth column (the column for pixel type "0" in this example) has eight groups of two values. In this regard, column "0" includes a first group of alternating "0" and "1" values in rows 0 through 33 (FIG. 6A), followed by a group of alternating "2" and "3" values in rows 34 through 67 (FIGS. 6A and 6B), and then a third group of alternating "4" and "5" values (rows 68 through 101 in FIGS. 6B and 6C), etc., for a total of eight groups of two values, where these same conditions are met by the equation-based implementation of the first encoder embodiment of FIG. 5.

Figure 7:
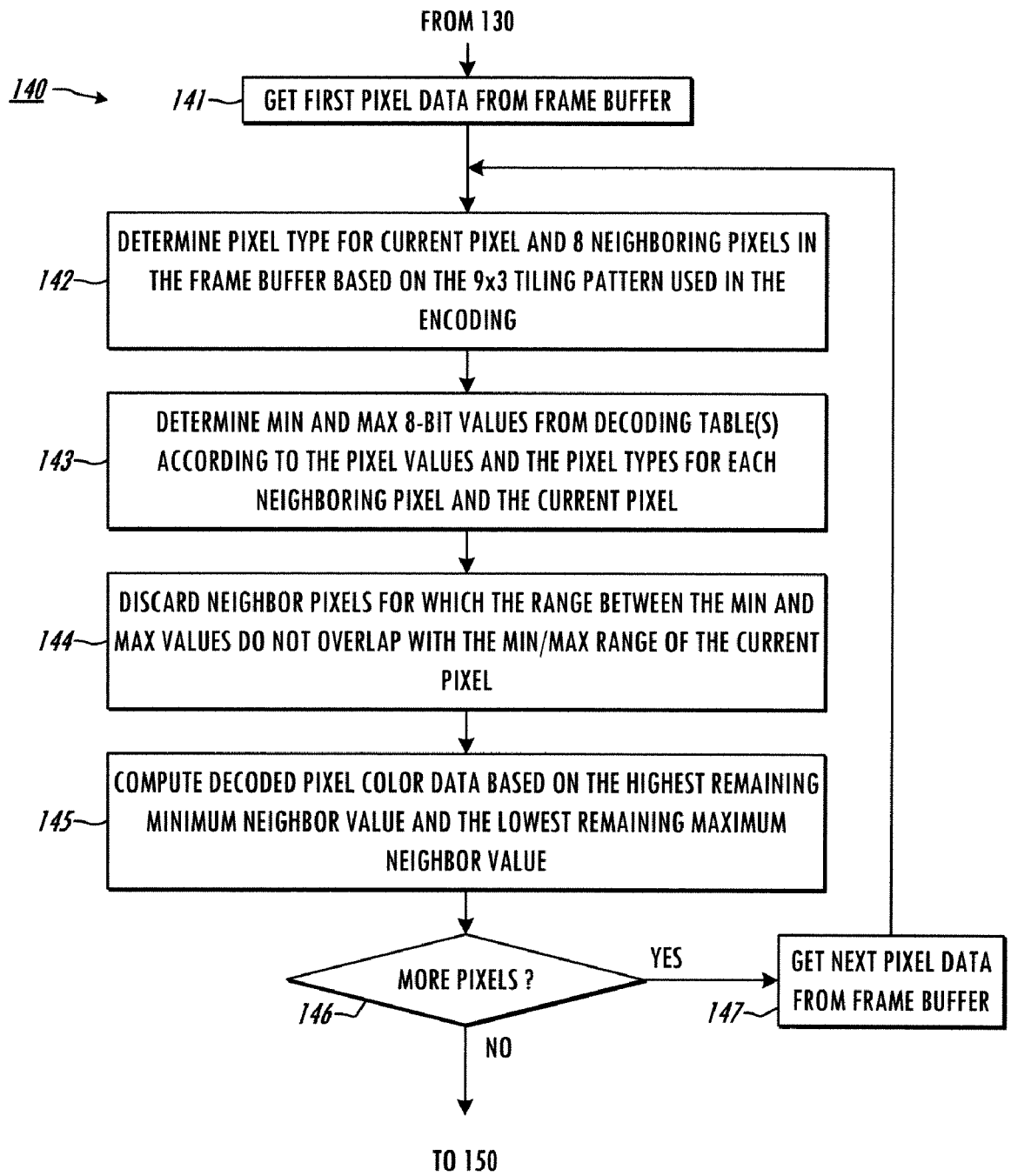
FIG. 7 is a flow diagram illustrating further details of the exemplary data decoding of FIG. 2 in accordance with the present disclosure.

Referring also to FIGS. 7-11, with the encoded values in the frame buffer, the decoder 70 of the controller 16 then decodes the image data to provide 8-bit decoded image data values that may be rendered on a display or printed to a printable media using the print engine 14 in the exemplary system 10 of FIG. 1. FIG. 7 illustrates further details of the exemplary data decoding at 140 in the method 100 of FIG. 2 in accordance with the present disclosure, where the decoding for a given 4-bit encoded value is done according to the 4-bit value and according to the assigned pixel type value for that pixel, as well as according to the data values of the neighboring pixels in a 3×3 window surrounding the current pixel to provide an 8-bit decoded color image data value.

A first encoded 4-bit pixel data value is obtained from the frame buffer 56 at 141 in FIG. 7, and the pixel type value therefor is determined at 142. A diagram 400 in FIG. 8 illustrates the relative positions of encoded 4-bit color image data values for a given pixel type and the type values for neighboring pixels for pixel types 0 through 8 in diagrams 400a-400i, respectively. For illustrative purposes, one original 8-bit input pixel data value (e.g., for either C, M, Y, or K) having a value of 193, for which the original pixel array location corresponds to pixel type "4" is encoded by the first encoder embodiment as a value of "11". For decoding this 4-bit data value, the decoder ascertains the pixel type at 142 as "4" (θ=4 for diagram 400e in FIG. 8) based on the 9×3 tiling pattern used in the encoding.

At 143, the decoder determines minimum and maximum 8-bit values from the encoding table 50, 300 for each neighboring pixel according to the neighbor pixel type (θ=0-3 and 5-8) and according to the 4-bit encoded pixel data for the neighbor pixels. In the example, the neighbor pixels have 4-bit encoded data values and pixel type values as shown in the diagram 511 of FIG. 10 as follows; neighbor pixel type 0=10, type 1=12, type 2=11, type 3=11, type 5=12, type 6=12, type 7=11, and type 8=11, where these values can also be found in row 193 of the exemplary encoder table 300 in FIG. 6F.

Using either the encoder table itself (equations 501-50*i* in FIG. 5 or table 300 in FIGS. 6A-6H), or alternatively using optional minimum and maximum value decoder tables 500 and 510 in FIGS. 9A and 9B, respectively, the decoder 70 obtains the minimum and maximum 8-bit values for each of the neighboring pixels. In the encoder table 300, for example, it is seen that for the neighbor pixel type 0, the minimum 8-bit value corresponding to an encoded value of "10" is 171 and the maximum 8-bit value corresponding to an encoded value of "10" is 203. For a type 1 pixel having a 4-bit encoded value of "12", the minimum and maximum 8-bit values in the table 300 are 192 and 209, respectively.

This minimum and maximum data is optionally provided in the minimum and maximum decoder tables 500 and 510 in FIGS. 9A and 9B. In the first embodiment of FIG. 9A, the minimum value decoding table 500 has sixteen rows corresponding to each possible 4-bit data value, where each row includes a unique set of nine 8-bit data minimum value entries individually corresponding to one of the pixel type values. In addition, the maximum value decoding table 510 in FIG. 9B includes sixteen 16 rows corresponding to each possible 4-bit data value, with each row including nine 8-bit data maximum value entries individually corresponding to one of the 9 unique pixel type values.

Figures 10, 11:
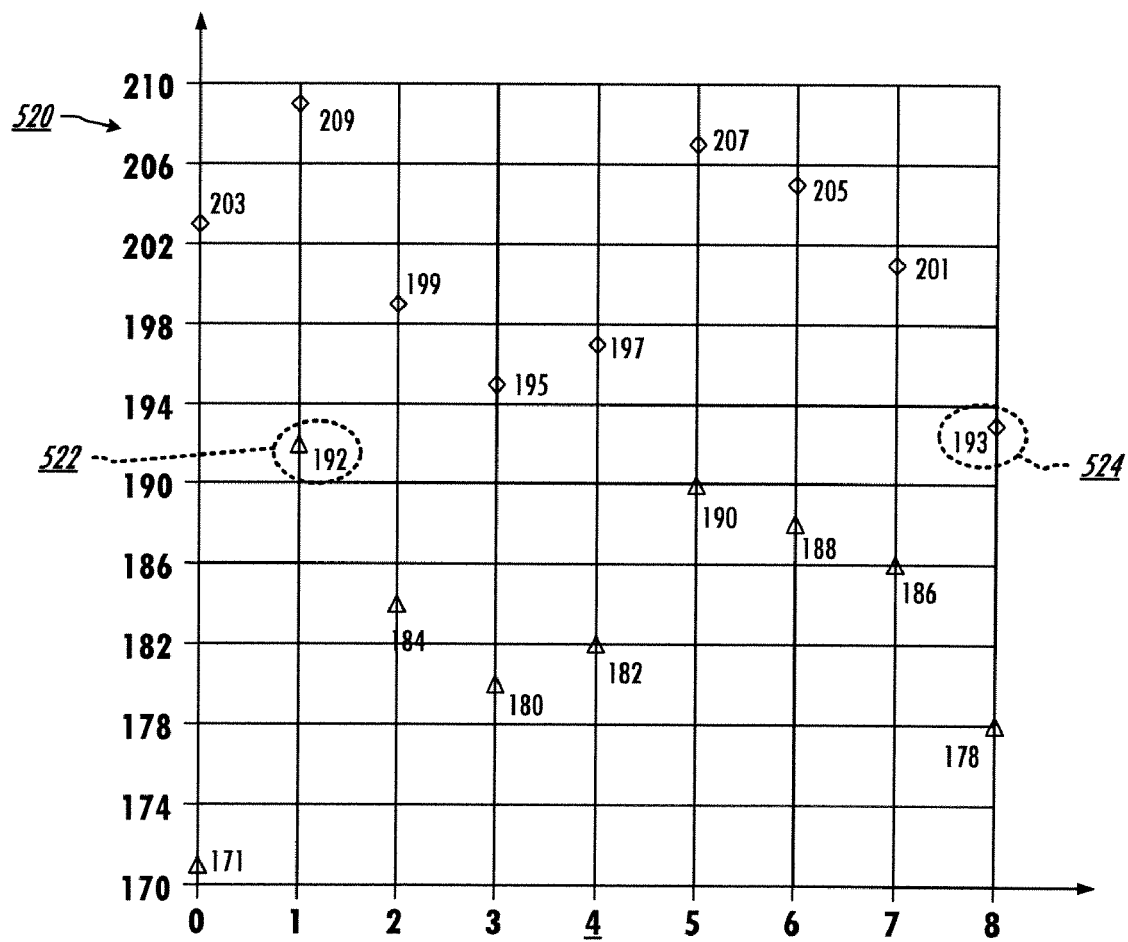
FIG. 10 is a schematic diagram showing an example of encoded color image data values for a given pixel of type 4 and the surrounding neighbor data values in a 3×3 window.
FIG. 11 is a graph showing the minimum and maximum data values for the given type 4 pixel and the surrounding neighbor pixels obtained from the data values in the 3×3 window of FIG. 10 using the decoder tables of FIGS. 9A and 9B.

The decoder determines these values at 143 in FIG. 7 from either source, where the minimum and maximum 8-bit values for the example are shown in the graph 520 of FIG. 11, in which triangle-shaped points are minimum values and diamond-shaped points are maximum values. At 144, the decoder may optionally discard or exclude neighbor pixels for which the range between the minimum and maximum 8-bit values do not overlap with the minimum and to maximum value range of the current pixel.

At 145, of the remaining neighbor values, the decoder 70 identifies the highest minimum 8-bit value and the lowest maximum 8-bit value for the neighboring pixels, and computes a decoded 8-bit data value for the current pixel based at least partially on the highest minimum 8-bit value and the lowest maximum 8-bit value for the neighboring pixels. As shown in FIG. 11, in the described example, the highest minimum value 522 is 192 and the lowest maximum value 524 is 193. In one embodiment, the decoder 70 computes the decoded 8-bit data value by averaging the highest minimum 8-bit value (192) and the lowest maximum 8-bit value (193) for the neighboring pixels, and selectively rounds the result up or down according to the value of the ninth column of the encoder table. In this case, the computation at 145 uses the most significant bit (MSB) of the 4-bit neighbor value of type "0" (10 in this example) to determine the least significant bit (LSB) of the decoded 8-bit value. In one embodiment, this is done by implementing the following equation:

Decoded Value=Average+(((Average>>7) XOR $e_0$)& 1, where the "&" operator signifies a Boolean AND operation.

For the above-described numeric example, the computed decoded 8-bit image data value for the current pixel of type "4" is thus 193, which corresponds to the original value of 193. The inventor has appreciated that the above described encoding and deciding techniques can facilitate lossless encoding to 4-bits, particularly where all the neighbor pixels are originally of the same 8-bit value as the current pixel.

Referring now to FIGS. 12A-12H, 13A, and 13B, a second encoding and decoding embodiment are illustrated, in which the encoding table 600 of FIGS. 12A-12H is Gray coded with each row differing from the previous row by exactly one entry. FIGS. 13A and 13B show corresponding minimum and maximum value decoding tables 700 and 710, respectively, which can be used to decode 4-bit image data encoded using the encoder table 600. The exemplary encoding table 600 in FIGS. 12A-12H is comprised of 256 rows corresponding to each of the possible 8-bit data values, in which each row has a unique set of 4-bit data value entries individually corresponding to one of the nine unique pixel type values, where successive rows differ by only one entry. In addition, like the above-described table 300, the table 600 of the second embodiment includes nine columns corresponding to the nine pixel types, with eight of the columns having clustered values (columns 1-8) and with the ninth column having 8 groups of two values. In addition, the exemplary minimum value decoding table 700 (FIG. 13A) has 16 rows, each including a unique set of nine 8-bit data minimum value entries individually corresponding to one of the 9 unique pixel type values, and the maximum value table 710 in FIG. 13B has 16 rows, each including nine 8-bit maximum value entries individually corresponding to one of the pixel types.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:
1. A method of processing 8-bit color image data, the method comprising:
receiving input color image data having 8-bit pixel data values;

assigning a pixel type value to each 8-bit pixel data value based on a 9×3 tiling pattern, the 9×3 tiling pattern having 9 unique pixel type values in each 3×3 window of the 9×3 tiling pattern;

encoding individual 8-bit input color image data values according to the 8-bit data value and the assigned pixel type value using an encoding table to provide 4-bit encoded color image data values, the encoding table having 256 rows corresponding to each possible 8-bit data value, with each row including a unique set of 9 4-bit data value entries individually corresponding to one of the 9 unique pixel type values, and wherein the table includes 9 columns corresponding to the 9 unique pixel type values with 8 of the 9 columns having clustered values and with the ninth column having 8 groups of two values;

storing the 4-bit encoded color image data values in a memory; and decoding individual 4-bit encoded color image data values according to the 4-bit encoded color image data value and the assigned pixel type value for a current pixel and its neighboring pixels in a 3×3 window surrounding the current pixel to provide 8-bit decoded color image data values by:

determining minimum and maximum 8-bit values from the encoding table for each neighboring pixel according to the pixel type and 4-bit encoded pixel data;

identifying the highest minimum 8-bit value and the lowest maximum 8-bit value for the neighboring pixels; and computing a decoded 8-bit data value for the current pixel based at least partially on the highest minimum 8-bit value and the lowest maximum 8-bit value for the neighboring pixels.

2. The method of claim 1, wherein the encoding table is Gray coded with each row differing from the previous row by exactly one entry.

3. The method of claim 2, wherein decoding the individual 4-bit encoded color image data values is done using a minimum value decoding table having 16 rows corresponding to each possible 4-bit data value, with each row including a unique set of 9 8-bit data minimum value entries individually corresponding to one of the 9 unique pixel type values, and a maximum value decoding table having 16 rows corresponding to each possible 4-bit data value, with each row including a unique set of 9 8-bit data maximum value entries individually corresponding to one of the 9 unique pixel type values.

4. The method of claim 3, further comprising printing the 8-bit decoded color image data values.

5. The method of claim 1, wherein decoding the individual 4-bit encoded color image data values is done using a minimum value decoding table having 16 rows corresponding to each possible 4-bit data value, with each row including a unique set of 9 8-bit data minimum value entries individually corresponding to one of the 9 unique pixel type values, and a maximum value decoding table having 16 rows corresponding to each possible 4-bit data value, with each row including a unique set of 9 8-bit data maximum value entries individually corresponding to one of the 9 unique pixel type values.

6. The method of claim 1, further comprising printing the 8-bit decoded color image data values.

7. The method of claim 1, wherein computing the decoded 8-bit data value comprises averaging the highest minimum 8-bit value and the lowest maximum 8-bit value for the neighboring pixels.

8. The method of claim 7, wherein computing the decoded 8-bit data value further comprises selectively rounding up or rounding down the average of the highest minimum 8-bit value and the lowest maximum 8-bit value according to the value of the ninth column of the encoder table.

9. The method of claim 1, wherein computing the decoded 8-bit data value further comprises excluding the minimum and maximum values for neighboring pixels for which a range between the minimum and maximum values does not overlap a range between the minimum and maximum values for the current pixel.

10. An image processing system, comprising:
a rendering engine operative to render color image data;
a controller receiving input color image data having 8-bit pixel data values, the controller comprising:
an encoder operative to assign a pixel type value to each 8-bit pixel data value based on a 9×3 tiling pattern, the 9×3 tiling pattern having 9 unique pixel type values in each 3×3 window of the 9×3 tiling pattern, the encoder comprising an encoding table having 256 rows corresponding to each possible 8-bit data value, with each row including a unique set of 9 4-bit data value entries individually corresponding to one of the 9 unique pixel type values, the table including 9 columns corresponding to the 9 unique pixel type values with 8 of the 9 columns having clustered values and with the ninth column having 8 groups of two values, the encoder operable to encode individual 8-bit input color image data values using the encoder table according to the 8-bit data value and the assigned pixel type value to provide 4-bit encoded color image data values;
a frame buffer memory operative to store the 4-bit encoded color image data values; and
a decoder operative to decode individual 4-bit encoded color image data values according to the 4-bit encoded color image data value and the assigned pixel type value for a current pixel and its neighboring pixels in a 3×3 window surrounding the current pixel to provide 8-bit decoded color image data values by determining minimum and maximum 8-bit values from the encoding table for each neighboring pixel according to the pixel type and 4-bit encoded pixel data, identifying the highest minimum 8-bit value and the lowest maximum 8-bit value for the neighboring pixels, and computing a decoded 8-bit data value for the current pixel based at least partially on the highest minimum 8-bit value and the lowest maximum 8-bit value for the neighboring pixels.

11. The system of claim 10, wherein the rendering engine is a print engine operative to print the decoded color image data on a printable media.

12. The system of claim 10, wherein the encoding table is Gray coded with each row differing from the previous row by exactly one entry.

13. The system of claim 10, wherein the decoder comprises:
a minimum value decoding table having 16 rows corresponding to each possible 4-bit data value, with each row including a unique set of 9 8-bit data minimum value entries individually corresponding to one of the 9 unique pixel type values; and
a maximum value decoding table having 16 rows corresponding to each possible 4-bit data value, with each row including a unique set of 9 8-bit data maximum value entries individually corresponding to one of the 9 unique pixel type values.

14. The system of claim 10, wherein the decoder is operative to average the highest minimum 8-bit value and the lowest maximum 8-bit value for the neighboring pixels to compute the decoded 8-bit data value.

15. The system of claim 14, wherein the decoder is further operative to selectively round up or round down the average of the highest minimum 8-bit value and the lowest maximum 8-bit value according to the value of the ninth column of the encoder table.

16. The system of claim 15, wherein the decoder is operative to exclude the minimum and maximum values for neighboring pixels for which a range between the minimum and maximum values does not overlap a range between the minimum and maximum values for the current pixel to compute the decoded 8-bit data value.

17. The system of claim 14, wherein the decoder is operative to exclude the minimum and maximum values for neighboring pixels for which a range between the minimum and maximum values does not overlap a range between the minimum and maximum values for the current pixel to compute the decoded 8-bit data value.

18. A system for encoding and decoding image data, comprising:
  a processor-based encoder operative to receive incoming 8-bit color image data and to assign a pixel type value to each 8-bit pixel data value based on a 9×3 tiling pattern, the 9×3 tiling pattern having 9 unique pixel type values in each 3×3 window of the 9×3 tiling pattern, the encoder comprising an encoding table having 256 rows corresponding to each possible 8-bit data value, with each row including a unique set of 9 4-bit data value entries individually corresponding to one of the 9 unique pixel type values, the table including 9 columns corresponding to the 9 unique pixel type values with 8 of the 9 columns having clustered values and with the ninth column having 8 groups of two values, the encoder operable to encode individual 8-bit input color image data values using the encoder table according to the 8-bit data value and the assigned pixel type value to provide 4-bit encoded color image data values; and
  a processor-based decoder operative to decode individual 4-bit encoded color image data values according to the 4-bit encoded color image data value and the assigned pixel type value for a current pixel and its neighboring pixels in a 3×3 window surrounding the current pixel to provide 8-bit decoded color image data values by determining minimum and maximum 8-bit values from the encoding table for each neighboring pixel according to the pixel type and 4-bit encoded pixel data, identifying the highest minimum 8-bit value and the lowest maximum 8-bit value for the neighboring pixels, and computing a decoded 8-bit data value for the current pixel based at least partially on the highest minimum 8-bit value and the lowest maximum 8-bit value for the neighboring pixels.

19. The system of claim 18, wherein the encoding table is Gray coded with each row differing from the previous row by exactly one entry.

20. The system of claim 18, wherein the decoder comprises:
  a minimum value decoding table having 16 rows corresponding to each possible 4-bit data value, with each row including a unique set of 9 8-bit data minimum value entries individually corresponding to one of the 9 unique pixel type values; and
  a maximum value decoding table having 16 rows corresponding to each possible 4-bit data value, with each row including a unique set of 9 8-bit data maximum value entries individually corresponding to one of the 9 unique pixel type values.

* * * * *